(12) United States Patent
Yoshida

(10) Patent No.: US 9,754,721 B2
(45) Date of Patent: Sep. 5, 2017

(54) BIAXIALLY ORIENTED FILM FOR ELECTRICAL INSULATION AND FILM CAPACITOR MADE USING BIAXIALLY ORIENTED FILM FOR ELECTRICAL INSULATION

(75) Inventor: Tetsuo Yoshida, Anpachi-gun (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 608 days.

(21) Appl. No.: 13/504,778

(22) PCT Filed: Oct. 26, 2010

(86) PCT No.: PCT/JP2010/068931
§ 371 (c)(1),
(2), (4) Date: Apr. 27, 2012

(87) PCT Pub. No.: WO2011/052563
PCT Pub. Date: May 5, 2011

(65) Prior Publication Data
US 2012/0217040 A1    Aug. 30, 2012

(30) Foreign Application Priority Data

Oct. 28, 2009  (JP) ................... 2009-247751
Mar. 24, 2010  (JP) ................... 2010-068113

(51) Int. Cl.
| | |
|---|---|
| *B32B 15/08* | (2006.01) |
| *B32B 15/09* | (2006.01) |
| *B32B 27/08* | (2006.01) |
| *B32B 27/18* | (2006.01) |
| *B32B 27/20* | (2006.01) |
| *B32B 27/36* | (2006.01) |
| *B32B 27/30* | (2006.01) |
| *B29C 47/00* | (2006.01) |
| *B29C 47/36* | (2006.01) |
| *C08K 7/16* | (2006.01) |
| *C08K 5/541* | (2006.01) |
| *C08K 5/16* | (2006.01) |
| *C08K 5/20* | (2006.01) |
| *C08K 3/04* | (2006.01) |
| *C08L 67/02* | (2006.01) |
| *C08L 67/03* | (2006.01) |
| *C08L 83/04* | (2006.01) |
| *C08L 25/06* | (2006.01) |
| *C09D 183/08* | (2006.01) |
| *C09D 183/04* | (2006.01) |
| *H01G 4/18* | (2006.01) |

(Continued)

(52) U.S. Cl.
CPC ............. *H01G 4/18* (2013.01); *B32B 27/18* (2013.01); *B32B 27/30* (2013.01); *B32B 27/36* (2013.01); *C08J 5/18* (2013.01); *C08K 5/20* (2013.01); *C08L 25/06* (2013.01); *C08L 67/02* (2013.01); *H01B 3/421* (2013.01); *H01B 3/442* (2013.01); *H01G 4/224* (2013.01); *B29C 47/0021* (2013.01); *B29C 47/36* (2013.01); *B32B 15/08* (2013.01); *B32B 15/09* (2013.01); *B32B 27/08* (2013.01); *B32B 27/20* (2013.01); *B32B 27/302* (2013.01); *B32B 2250/03* (2013.01); *B32B 2255/10* (2013.01); *B32B 2255/205* (2013.01); *B32B 2255/26* (2013.01); *B32B 2255/28* (2013.01); *B32B 2307/20* (2013.01); *B32B 2307/204* (2013.01); *B32B 2367/00* (2013.01); *B32B 2457/16* (2013.01); *C08J 2367/02* (2013.01); *C08K 5/005* (2013.01); *C08K 5/16* (2013.01); *C08K 7/16* (2013.01); *C08K 2003/045* (2013.01); *C08L 67/03* (2013.01); *C08L 83/04* (2013.01); *C08L 2205/22* (2013.01); *C09D 183/04* (2013.01); *C09D 183/08* (2013.01); *H01B 3/30* (2013.01); *H01B 3/422* (2013.01); *H01B 3/423* (2013.01); *H01B 3/46* (2013.01); *Y10T 428/254* (2015.01); *Y10T 428/31786* (2015.04)

(58) Field of Classification Search
None
See application file for complete search history.

(56) References Cited

U.S. PATENT DOCUMENTS

| | | | | |
|---|---|---|---|---|
| 3,937,754 A | * | 2/1976 | Shimotsuma et al. | ........ 525/444 |
| 4,278,477 A | * | 7/1981 | Reinhold | ........ 148/273 |

(Continued)

FOREIGN PATENT DOCUMENTS

| | | |
|---|---|---|
| EP | 1 344 790 A1 | 9/2003 |
| EP | 1 582 554 A1 | 10/2005 |

(Continued)

OTHER PUBLICATIONS

IRGANOX 1098 Datasheet. Sep. 2010.*

(Continued)

*Primary Examiner* — Vivian Chen
(74) *Attorney, Agent, or Firm* — Sughrue Mion, PLLC

(57) ABSTRACT

Disclosed is a biaxially oriented film for electrical insulation having even better withstand voltage characteristics than before together with excellent film-forming properties. The biaxially oriented film for electrical insulation of the invention is a film that includes a substrate layer containing a crystalline thermoplastic resin as a main component. The substrate layer contains a phenolic stabilizer in an amount of 0.001 wt % or more and 3 wt % or less based on the weight of the substrate layer. The phenolic stabilizer is an alkylenebisamide-type hindered phenol.

17 Claims, No Drawings

(51) Int. Cl.
*H01B 3/30* (2006.01)
*H01B 3/42* (2006.01)
*H01B 3/44* (2006.01)
*H01B 3/46* (2006.01)
*C08J 5/18* (2006.01)
*H01G 4/224* (2006.01)
*C08K 5/00* (2006.01)

(56) References Cited

U.S. PATENT DOCUMENTS

| | | | | |
|---|---|---|---|---|
| 4,366,270 | A * | 12/1982 | Ruter | C08G 63/88 523/307 |
| 4,539,389 | A * | 9/1985 | Kiriyama et al. | 528/272 |
| 4,729,915 | A * | 3/1988 | Sakamoto et al. | 428/141 |
| 4,761,327 | A * | 8/1988 | Hamano et al. | 428/220 |
| 4,822,522 | A * | 4/1989 | Tajima et al. | 252/400.24 |
| 5,391,429 | A * | 2/1995 | Otani et al. | 428/327 |
| 5,625,527 | A * | 4/1997 | Hatada | 361/273 |
| 5,738,926 | A * | 4/1998 | Kinoshita | H01G 4/015 428/141 |
| 5,763,512 | A * | 6/1998 | Schmitter | 524/119 |
| 5,807,966 | A * | 9/1998 | Pfaendner | C08G 63/78 521/48 |
| 5,867,316 | A | 2/1999 | Carlson et al. | |
| 5,972,439 | A * | 10/1999 | Tsunashima et al. | 428/1.33 |
| 6,194,061 | B1 * | 2/2001 | Satoh et al. | 428/341 |
| 6,221,497 | B1 * | 4/2001 | Roman et al. | 428/447 |
| 6,235,371 | B1 * | 5/2001 | Mitsuhashi et al. | 428/141 |
| 6,760,157 | B1 * | 7/2004 | Allen | G02B 5/3008 359/487.02 |
| 7,022,388 | B2 * | 4/2006 | Hashimoto et al. | 428/34.9 |
| 7,084,197 | B2 * | 8/2006 | Chin et al. | 524/99 |
| 7,851,037 | B2 * | 12/2010 | Mahiat et al. | 428/35.7 |
| 8,211,517 | B2 * | 7/2012 | Martens et al. | 428/35.7 |
| 8,680,206 | B2 * | 3/2014 | Aoyama | C08J 5/18 136/252 |
| 2002/0122932 | A1 * | 9/2002 | Peiffer | B32B 27/36 428/331 |
| 2003/0171529 | A1 * | 9/2003 | Murschall et al. | 528/272 |
| 2004/0101701 | A1 * | 5/2004 | Olek | B32B 27/36 428/482 |
| 2005/0079372 | A1 * | 4/2005 | Schmal et al. | 428/482 |
| 2005/0221096 | A1 * | 10/2005 | Kliesch et al. | 428/423.1 |
| 2006/0057408 | A1 * | 3/2006 | Kliesch | C08J 5/18 428/480 |
| 2006/0057409 | A1 * | 3/2006 | Kliesch | C08J 5/18 428/480 |
| 2006/0126175 | A1 * | 6/2006 | Lu | G03B 21/56 359/460 |
| 2006/0183829 | A1 * | 8/2006 | Fujimoto et al. | 524/186 |
| 2007/0237972 | A1 * | 10/2007 | Kliesch | B32B 27/18 428/480 |
| 2008/0026170 | A1 * | 1/2008 | Yamada et al. | 428/34.9 |
| 2009/0123680 | A1 * | 5/2009 | Mahiat | C08J 5/18 428/35.7 |
| 2010/0000603 | A1 * | 1/2010 | Tsuzuki et al. | 136/259 |
| 2010/0062239 | A1 * | 3/2010 | Yoshida | 428/323 |
| 2010/0178483 | A1 | 7/2010 | Masuda et al. | |
| 2010/0189483 | A1 * | 7/2010 | Inoue | 399/358 |
| 2010/0209722 | A1 * | 8/2010 | Yoshida | 428/458 |

FOREIGN PATENT DOCUMENTS

| | | |
|---|---|---|
| GB | 2331991 A | 6/1999 |
| JP | 05-287099 A | 11/1993 |
| JP | 07-278473 * | 10/1995 |
| JP | 2000-173855 A | 6/2000 |
| JP | 2003-301039 A | 10/2003 |
| JP | 2005-289065 A | 10/2005 |
| JP | 2009-197196 A | 9/2009 |
| JP | 2009-221387 A | 10/2009 |
| JP | 2009-235321 A | 10/2009 |
| WO | 2008/093885 A1 | 8/2008 |
| WO | 2008/149869 A1 | 12/2008 |
| WO | 2008/156210 A1 | 12/2008 |

OTHER PUBLICATIONS

Karayannidis et al., "Effect of some current antioxidants on the thermo-oxidative stability of poly(ethylene terephthalate)", Polymer Degradation and Stability, 1994, vol. 44, No. 1, pp. 9-15.
Communication dated May 30, 2016, issued by the European Patent Office in corresponding European Application No. 10826695.8.
Communication dated Jun. 22, 2016, issued by the European Patent Office in corresponding European Application No. 10 826 695.8.

* cited by examiner

BIAXIALLY ORIENTED FILM FOR ELECTRICAL INSULATION AND FILM CAPACITOR MADE USING BIAXIALLY ORIENTED FILM FOR ELECTRICAL INSULATION

CROSS REFERENCE TO RELATED APPLICATIONS

This application is a National Stage of International Application No. PCT/JP2010/068931 filed on Oct. 26, 2010, the contents of which are incorporated herein by reference in their entirety.

TECHNICAL FIELD

The present invention relates to a biaxially oriented film for electrical insulation and a film capacitor made using the biaxially oriented film for electrical insulation. More specifically, the invention relates to a biaxially oriented film for electrical insulation having excellent withstand voltage characteristics and excellent film-forming properties, and also to a film capacitor made using the biaxially oriented film for electrical insulation.

BACKGROUND ART

As crystalline thermoplastic resin films for electrical insulation, films made of polypropylene resins, polystyrene resins, polyester resins, and polyphenylene sulfide resins have been known, for example, and they have been used for film capacitors, flexible printed circuit boards, motor insulation, etc. The film capacitor is produced by combining such a crystalline thermoplastic resin film with an aluminum foil or like thin metal film, followed by winding or stacking. The flexible printed circuit board is produced by stacking the thin metal film on at least one side of the crystalline thermoplastic resin film to form a circuit, for example. A film for motor insulation is used, for example, as a wedge material or a slot material for insulation between a coil and a stator in a motor.

In recent years, electrically insulating materials for electric cars, hybrid cars, and the like are required to have higher withstand voltage characteristics.

As a polyester film for capacitors which has excellent heat resistance, moisture resistance, and electrical characteristics and is usable in a car engine compartment, for example, JP-A-2000-173855 (Patent Document 1) discloses the use of a polyethylene-2,6-naphthalate film having an intrinsic viscosity and a crystallinity within specific ranges.

Further, as a film for capacitors which has excellent dielectric characteristics and withstand voltage characteristics, JP-A-2005-289065 (Patent Document 2) proposes a thermoplastic resin film containing a large amount of a phenolic stabilizer. Specifically, it discloses the addition of a stabilizer during the production of a thermoplastic resin. Likewise, JP-A-2003-301039 (Patent Document 3) discloses the presence of at least one stabilizer capable of preventing oxidative decomposition in a concentration of 100 to 10000 ppm relative to a crystalline polyester. The Patent Document 3 is characterized in that the stabilizer chemically bonded to the crystalline polyester is present to reduce surface defects, whereby the contamination of a film production apparatus during production can be reduced. It is also disclosed that in order to form the chemical bond between the stabilizer to the polyester, a hindered phenol having a carboxyl group and/or an ester group is preferably mixed during a polycondensation reaction of the polyester and used.

As seen above, as a method for incorporating the large amount of a stabilizer into a film, it has been proposed to add the stabilizer in a stage of the resin polycondensation reaction. However, WO 2008/149869 (Patent Document 4) discloses a polyester film for electrical insulation which contains a titanium compound and a radical scavenging stabilizer in an amount of 1000 to 50000 ppm, and proposes that the proportion of the radical scavenging stabilizer chemically bonded to a polyester is not more than 200 ppm. The Patent Document 4 states as follows. When the radical scavenging stabilizer is added during film formation, the stabilizer does not react with the polyester resin in the resulting film. As a result, the radical scavenging ability of the stabilizer is enhanced, and also, in synergy with a titanium catalyst, withstand voltage characteristics higher than before can be obtained. Further, an initial withstand voltage is maintained even after a long-term heat treatment.

Patent Document 1: JP-A-2000-173855
Patent Document 2: JP-A-2005-289065
Patent Document 3: JP-A-2003-301039
Patent Document 4: WO 2008/149869

DISCLOSURE OF THE INVENTION

Problems that the Invention is to Solve

However, studies using these stabilizers showed the following. When a stabilizer such as a pentaerythritol-type hindered phenol is used, and a large amount of the stabilizer is added during the polymerization of a thermoplastic resin, the stabilizer is bonded to the resin like a crosslinking agent. Thus, although the resulting thermoplastic resin has a high melt viscosity, the degree of polymerization itself is insufficient. As a result, the resin tends to be brittle, and film-forming properties tend to deteriorate.

The following was also shown. When the stabilizer such as the pentaerythritol-type hindered phenol is used, and the stabilizer is added during film formation to reduce the proportion of chemical bonding between the resin and the stabilizer, although film-forming properties are stabilized, the stabilizer partially sublimes during film formation. This may cause the contamination of a die or the deposition of sublimates on a film surface. In addition, because of the sublimation of the stabilizer, the effective amount of the stabilizer relative to the added amount may decrease.

The invention aims to solve the problems mentioned above. An object of the invention is to provide a biaxially oriented film for electrical insulation having even better withstand voltage characteristics than before together with excellent film-forming properties.

A second object of the invention is to provide a biaxially oriented film for electrical insulation having even better withstand voltage characteristics than before together with excellent film-forming properties, which also has excellent self-healing properties.

A third object of the invention is to provide a biaxially oriented film for electrical insulation having even better withstand voltage characteristics than before together with excellent film-forming properties, which also has less variation in the withstand voltage characteristics.

A fourth object of the invention is to provide a biaxially oriented film for electrical insulation having even better withstand voltage characteristics than before together with excellent film-forming properties, which also has a low dielectric loss tangent and is excellent in suppressing self-heating.

Means for Solving the Problems

The object of the invention can be achieved by a biaxially oriented film for electrical insulation, which is a film that includes a substrate layer containing a crystalline thermoplastic resin as a main component (Item 1). The substrate layer contains a phenolic stabilizer in an amount of 0.001 wt % or more and 3 wt % or less based on the weight of the substrate layer, and the phenolic stabilizer is an alkylenebisamide-type hindered phenol.

The biaxially oriented film for electrical insulation of the invention also encompasses at least one of the following as a preferred embodiment.

Item 2. The biaxially oriented film for electrical insulation according to Item 1, wherein the phenolic stabilizer is a hexamethylenebisamide-type hindered phenol.

Item 3. The biaxially oriented film for electrical insulation according to Item 1 or 2, wherein the phenolic stabilizer has a melting point of 130° C. or more and 200° C. or less.

Item 4. The biaxially oriented film for electrical insulation according to any one of Items 1 to 3, wherein the crystalline thermoplastic resin is a polyester.

Item 5. The biaxially oriented film for electrical insulation according to Item 4, wherein the polyester is polyethylene naphthalene dicarboxylate.

Item 6. The biaxially oriented film for electrical insulation according to any one of Items 1 to 5, wherein the crystalline thermoplastic resin is a composition containing a polyester and a polystyrene.

Item 7. The biaxially oriented film for electrical insulation according to Item 6, wherein the polyester is polyethylene naphthalene dicarboxylate, and the polystyrene is a syndiotactic polystyrene.

Item 8. The biaxially oriented film for electrical insulation according to any one of Items 1 to 7, wherein the substrate layer contains spherical crosslinked polymeric resin particles (A) having an average particle size of 0.5 µm or more and 3.0 µm or less in an amount of 0.01 wt % or more and 1.5 wt % or less based on the weight of the substrate layer.

Item 9. The biaxially oriented film for electrical insulation according to Item 8, wherein the substrate layer further contains inert particles (B) having an average particle size of 0.01 µm or more and less than 0.5 µm in an amount of 0.05 wt % or more and 2.0 wt % or less based on the weight of the substrate layer, the average particle size of the inert particles (B) being at least 0.4 µm smaller than the average particle size of the spherical crosslinked polymeric resin particles (A).

Item 10. The biaxially oriented film for electrical insulation according to Item 9, wherein the inert particles (B) are spherical crosslinked polymeric resin particles (B1).

Item 11. The biaxially oriented film for electrical insulation according to Item 8 or 10, wherein the spherical crosslinked polymeric resin particles (A) and/or (B1) are silicone resin particles.

Item 12. The biaxially oriented film for electrical insulation according to any one of Items 1 to 11, wherein the substrate layer contains a fullerene in an amount of 0.01 wt % or more and 1 wt % or less based on the weight of the substrate layer.

Item 13. The biaxially oriented film for electrical insulation according to any one of Items 1 to 12, wherein a breakdown voltage of the film at 25° C. is 450 V/µm or more.

Item 14. The biaxially oriented film for electrical insulation according to any one of Items 1 to 13, wherein an average breakdown voltage of the film at 25° C. obtained from 50 measurements is 450 V/µm or more with a standard deviation of 20 V/µm or less.

Item 15. The biaxially oriented film for electrical insulation according to any one of Items 1 to 14, wherein the substrate layer has a refractive index in the thickness direction nz of more than 1.505.

Item 16. The biaxially oriented film for electrical insulation according to any one of Items 1 to 15, wherein the substrate layer has a thickness of 0.2 µm or more and 5 µm or less.

Item 17. The biaxially oriented film for electrical insulation according to any one of Items 1 to 16, including a coating layer on one side or both sides of the substrate layer, the coating layer containing at least one member selected from the group consisting of waxes, silicone compounds, and fluorine compounds in an amount of 1 to 50 wt % based on the weight of the coating layer.

Item 18. The biaxially oriented film for electrical insulation according to Item 17, wherein the waxes are polyolefin waxes.

Item 19. The biaxially oriented film for electrical insulation according to Item 17, further including a metal layer on the coating layer.

Item 20. The biaxially oriented film for electrical insulation according to any one of Items 1 to 18, used for motor insulation.

Item 21. The biaxially oriented film for electrical insulation according to any one of Items 1 to 19, used for film capacitors.

The invention also encompasses a film capacitor made using the biaxially oriented polyester film for electrical insulation of the invention.

The invention was accomplished based on the following findings. In the case where an alkylenebisamide-type hindered phenol is used as a stabilizer, the stabilizer is less likely to sublime during a film formation process or a master-pellet preparation process. As a result, die contamination or sublimate deposition can be reduced. In addition, the effective amount of the stabilizer is increased, whereby even better withstand voltage characteristics than before can be obtained. Further, even when the stabilizer is chemically bonded to a resin, the resulting resin is not brittle, whereby film-forming properties are stabilized.

Advantage of the Invention

According to the invention, a biaxially oriented film for electrical insulation of the invention has much higher withstand voltage characteristics than conventional insulating films and also has excellent film-forming properties. The industrial value thereof is extremely high.

BEST MODE FOR CARRYING OUT THE INVENTION

Hereinafter, the invention will be described in detail.

A biaxially oriented film for electrical insulation of the invention is a film having at least one layer including a substrate layer made of a crystalline thermoplastic resin as a main component. The substrate layer contains a phenolic stabilizer in an amount of 0.001 wt % or more and 3 wt % or less based on the weight of the substrate layer. The phenolic stabilizer is an alkylenebisamide-type hindered phenol.

<Crystalline Thermoplastic Resin>

The crystalline thermoplastic resin in the invention is not particularly limited as long as it is a commonly used crystalline thermoplastic resin. For example, it is preferably at least one member selected from the group consisting of polyesters, polyolefins, polystyrenes, polyphenylene sulfides, and polyphenylene ethers, which are used for films for electrical insulation. Among these crystalline thermoplastic resins, polyesters are particularly preferable. In addition, these crystalline thermoplastic resins may be used alone, and it is also possible to use a combination of two or more kinds. For example, a combination of a polyester and a polyolefin and a combination of a polyester and a polystyrene are preferable.

(Polyester)

Polyesters in the invention are polymers obtained by the polycondensation of a diol or a derivative thereof and a dicarboxylic acid or a derivative thereof. Examples of dicarboxylic acid components include terephthalic acid, isophthalic acid, naphthalenedicarboxylic acid, 4,4'-diphenyldicarboxylic acid, adipic acid, and sebacic acid. Examples of diol components include ethylene glycol, 1,4-butanediol, 1,4-cyclohexanedimethanol, and 1,6-hexanediol. Among polyesters obtained by the polycondensation of such a dicarboxylic acid component and such a diol component, polyethylene terephthalate and polyethylene naphthalene dicarboxylate are preferable. In terms of withstand voltage characteristics at high temperatures, polyethylene-2,6-naphthalene dicarboxylate is particularly preferable.

Polyesters in the invention may be any of homopolymers, copolymers with other polyesters, and mixtures of two or more kinds of polyesters. Other components in a copolymer or a mixture are preferably in an amount of 10 mol % or less, still more preferably 5 mol % or less, based on the number of moles of polyester repeating units. In the case of polyethylene terephthalate or polyethylene naphthalene dicarboxylate, examples of copolymerization components include diol components such as diethylene glycol, neopentyl glycol, and polyalkylene glycol and dicarboxylic acid components such as adipic acid, sebacic acid, phthalic acid, isophthalic acid, terephthalic acid, 2,6-naphthalenedicarboxylic acid, and 5-sodium sulfoisophthalic acid.

Polyesters in the invention can be produced by a conventionally known method, for example, a method in which a dicarboxylic acid and a diol are subjected to an esterification reaction optionally together with a copolymerization component, and the resulting reaction product is subjected to a polycondensation reaction to form a polyester. Polyesters may also be produced by a method in which derivatives of such raw material monomers are subjected to a transesterification reaction, and then the resulting reaction product is subjected to the polycondensation reaction to form a polyester.

In the case where a polyester is used, it is preferable to use a titanium compound as a catalyst in the production of the film of the invention. As a result, the withstand voltage characteristics are further improved in synergy with the hindered phenolic stabilizer of the invention. It is preferable that the titanium compound is a polyester-soluble titanium compound. The polyester-soluble titanium compound herein means an organic titanium compound. Specific examples thereof include compounds such as tetraethyl titanate, tetrapropyl titanate, tetrabutyl titanate, tetraphenyl titanate, partial hydrolysates thereof, ammonium titanyl oxalate, potassium titanyl oxalate, and titanium trisacetylacetonate, as well as products of a reaction of such a titanium compound with an aromatic polycarboxylic acid or an anhydride thereof, such as trimellitic anhydride. Among these, tetrabutyl titanate and titanium trimellitate are preferable. Titanium trimellitate is a compound obtained by a reaction between trimellitic anhydride and tetrabutyl titanate.

In a transesterification method, the titanium compound may be added prior to the start of the transesterification reaction, during the transesterification reaction, after the completion of the transesterification reaction, or immediately before the polycondensation reaction. Meanwhile, in an esterification method, it may be added after the completion of the esterification reaction or immediately before the polycondensation reaction.

The content of the titanium compound in the polyester is, as elemental titanium, preferably 5 to 20 ppm, still more preferably 7 to 18 ppm, and particularly preferably 8 to 17 ppm based on the weight of the polyester. When the amount of the titanium compound is less than a lower limit, the production of the polyester may be delayed during production. Meanwhile, when the amount is more than an upper limit, the resulting polyester has poor heat-resistant stability, and also the withstand voltage characteristics may deteriorate due to deposits of the titanium compound.

An antimony compound commonly used as a polymerization catalyst for polyesters tends to form deposits, and also such a catalyst is used in a large amount. Accordingly, deposits originating from the antimony compound sometimes cause the deterioration of withstand voltage characteristics. Meanwhile, in the case where the titanium compound is used, the catalyst amount can be extremely small as long as the polymerization reaction can be maintained. Thus, the deposits which inhibit the withstand voltage characteristics can be reduced, whereby the resulting film exhibits excellent withstand voltage characteristics. In addition, when a polyester-soluble titanium compound is used as the titanium compound, deposits are further reduced, whereby the withstand voltage characteristics are further enhanced.

Therefore, in the case where the crystalline thermoplastic resin is a polyester, although catalyst compounds other than the titanium compounds, such as the antimony compounds and germanium compounds, may be used as catalysts together with the titanium compound, when they are used together, it is preferable that such catalyst compounds other than the titanium compounds are used in small amounts. In the case where the catalyst compounds other than the titanium compounds are used in large amounts, this promotes the formation of deposits from catalysts, and, as a result, the withstand voltage characteristics of the film may deteriorate. Incidentally, a mechanism of the deterioration of the withstand voltage characteristics due to the deposits is believed to be attributable to electrolytic concentration caused by the formed deposits. When a catalyst other than the titanium compounds is used together, the content thereof is preferably 5 ppm or less, particularly preferably substantially zero, based on the weight of the polyester.

The intrinsic viscosity of the polyester is preferably 0.40 dl/g or more, still more preferably 0.40 to 0.80 dl/g, in o-chlorophenol at 35° C. When the intrinsic viscosity of the polyester is less than 0.4 dl/g, breakage may frequently occur during film formation, or the strength of a fabricated product may be insufficient. Meanwhile, when the intrinsic viscosity of the polyester is more than 0.8 dl/g, productivity in polymerization may decrease.

(Polyolefin)

Examples of polyolefins used in the invention include polyethylene, polypropylene, and polymethylpentene. Among these, polypropylene and polymethylpentene are preferable.

Polypropylene may be a propylene resin containing a propylene unit as a main component, and examples thereof include polypropylene, propylene-ethylene copolymers, and propylene-(meth)acrylic acid copolymers.

Polymethylpentene is crystalline poly-4-methyl-1-pentene, and examples thereof include homopolymers of 4-methyl-1-pentene and crystalline copolymers of 4-methyl-1-pentene and an α-olefin other than ethylene and 4-methyl-1-pentene. Examples of α-olefins other than ethylene and 4-methyl-1-pentene to be copolymerized with 4-methyl-1-pentene include $C_{3-20}$ α-olefins such as propylene, 1-butene, 1-hexene, 1-octene, 1-decene, 1-tetradecene, and 1-octadecene.

(Polystyrene)

Examples of polystyrenes include homopolymers and copolymers obtained from styrene, styrene derivatives such as poly(alkylstyrenes), etc. Although various polystyrenes including atactic polystyrenes, syndiotactic polystyrenes, and isotactic polystyrenes are all usable, among these, syndiotactic polystyrenes are particularly preferable in terms of heat resistance.

A syndiotactic polystyrene in the invention is a polystyrene having a syndiotactic stereochemical structure, and the term is used as a generic name for polystyrene polymers having the syndiotactic structure. Generally, tacticity is determined by carbon isotope nuclear magnetic resonance ($^{13}$C-NMR method), and is defined by proportions of a plurality of successive structural units, for example, as a dyad in the case of two units, a triad in the case of three units, and a pentad in the case of five units. The syndiotactic polystyrene in the invention is a polystyrene having a dyad tacticity of 75% or more, preferably 85% or more, and a pentad tacticity of 30% or more, preferably 50% or more.

Examples of such syndiotactic polystyrenes include polystyrenes, poly(alkylstyrenes), poly(halogenated styrenes), poly(alkoxystyrenes), poly(phenylstyrene), poly(vinylstyrene), and poly(vinylnaphthalene), each having the syndiotactic structure; polymers obtained by partially hydrogenating benzene rings thereof; mixtures thereof; and copolymers containing these structural units.

Examples of poly(alkylstyrenes) include poly(methylstyrene), poly(ethylstyrene), poly(propylstyrene), and poly(butylstyrene).

Examples of poly(halogenated styrenes) include poly(chlorostyrene), poly(bromostyrene), and poly(fluorostyrene).

Examples of poly(alkoxystyrenes) include poly(methoxystyrene) and poly(ethoxystyrene).

Among these, polystyrenes, poly(p-methylstyrene), poly(m-methylstyrene), and poly(p-tert-butylstyrene), each having the syndiotactic structure, are preferable, for example.

Copolymerization component in a syndiotactic polystyrene copolymer is preferably in an amount of 0.1 mol % or more and 10 mol % or less based on total repeating units. The lower limit of the copolymerization component is more preferably 1 mol %, still more preferably 3 mol %, and particularly preferably 5 mol %.

(Polyphenylene Sulfide)

Examples of polyphenylene sulfides include polyphenylene sulfide, polyphenylene sulfide ketone, polybiphenylene sulfide, and polyphenylene sulfide sulfone.

(Polyphenylene Ether)

Examples of polyphenylene ethers include poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-hydroxyethyl-1,4-phenylene)ether, and poly(2-methyl-6-chloroethyl-1,4-phenylene)ether. Among these, poly(2,6-dimethyl-1,4-phenylene) ether is particularly preferable. In addition, a polyphenylene ether copolymer is preferably a copolymer having a phenylene ether structure as a main component, examples thereof including a copolymer of 2,6-dimethylphenol and 2,3,6-trimethylphenol, a copolymer of 2,6-dimethylphenol and o-cresol, and a copolymer of 2,6-dimethylphenol and 2,6-diphenylphenol or of 2,6-dimethylphenol, 2,3,6-trimethylphenol, and o-cresol.

(Combination of Two or More Kinds)

These crystalline thermoplastic resins may be used alone, and it is also possible to use a combination of two or more kinds. For example, a combination of a polyester and a polyolefin and a combination of a polyester and a polystyrene are preferable. Among these combinations, it is preferable to use a polyester and a polystyrene together, and it is particularly preferable to use polyethylene naphthalene dicarboxylate and a syndiotactic polystyrene together.

In the case where a polyester is used as a main resin, the additional use of these resins improves the dielectric loss tangent (tan δ) as a film, and, in electrical insulation applications, the self-heating of a polyester resin can be further reduced.

In addition, in the case where a polyester is used as a main crystalline thermoplastic resin, a polyphenylene ether may be further used together with a polyolefin or a polystyrene. When a polyphenylene ether is used together, the withstand voltage characteristics and the dielectric loss tangent are further improved, and also the heat resistance, particularly glass transition temperature, is improved.

In the case where a composition containing such two or more kinds of resins is used as the crystalline thermoplastic resin, the content of the polyester (i) is preferably 50 wt % or more and 100 wt % or less, still more preferably 60 wt % or more and 95 wt % or less, and particularly preferably 70 wt % or more and 90 wt % or less based on 100 wt % of the total crystalline thermoplastic resin amount.

In the case where the crystalline thermoplastic resin is a combination of two or more kinds, a compatibilizer may further be used to enhance the compatibility of the resins.

<Phenolic Stabilizer>

The biaxially oriented film for electrical insulation of the invention contains, in the substrate layer, the alkylenebisamide-type hindered phenol as the phenolic stabilizer, and the content thereof is 0.001 wt % or more and 3 wt % or less based on the weight of the substrate layer. When the alkylenebisamide-type hindered phenol is used as the stabilizer, the stabilizer is less likely to sublime during the film formation process or the master-pellet preparation process. As a result, die contamination or sublimate deposition can be reduced. At the same time, when the stabilizer of the invention is used, the effective amount of the stabilizer in the film is increased, whereby even better withstand voltage characteristics than before can be obtained. Further, even when the stabilizer is chemically bonded to a resin, the resulting resin is not brittle, whereby film-forming properties are stabilized. In particular, although it is heretofore unknown to apply the stabilizer to a polyester, in the case where the stabilizer is applied to a polyester, even when the stabilizer is added during the film formation process or the master-pellet preparation process, the stabilizer tends to be chemically bonded to the resin. Thus, together with the low sublimability of the stabilizer itself, because of the reduction of the die contamination or the sublimate deposition and the increase in the effective amount of the stabilizer in the film, the withstand voltage characteristics are further improved than before.

It is preferable that the alkylenebisamide-type hindered phenol has a $C_{2-10}$ alkylene chain. In particular, generally, a hexamethylenebisamide-type hindered phenol is easily available. As a specific example of a hindered phenol compound having a hindered phenol at each end via an amide bond, N,N'-hexane-1,6-diylbis[3-(3,5-di-tert-butyl-4-hydroxyphenyl)propionamide] is mentioned.

Meanwhile, pentaerythritol-type phenolic stabilizers, which are widely used as the hindered phenolic stabilizers, for example, are unlikely to be chemically bonded to a resin during the film formation process or the master-pellet preparation process. Therefore, such a stabilizer is often added during resin polymerization to cause a reaction with, for example, a polyester resin. However, the stabilizer is bonded to the resin like a crosslinking agent. Thus, although the resulting resin has a high melt viscosity, it is difficult to obtain a sufficient degree of polymerization. Accordingly, the resin tends to be brittle, which is likely to cause the deterioration of the film-forming properties, such as the breakage of a clipped edge portion during film formation. Meanwhile, in the case where such a hindered phenolic stabilizer that is less reactive with a resin is added during the film formation process or the master-pellet preparation process, the stabilizer partially sublimates during film formation. This may lead to the contamination of a die or the deposition of the sublimates on the film surface, for example, and the effective amount of the stabilizer relative to the added amount may be reduced.

Among the alkylenebisamide-type hindered phenols, it is preferable to use a hindered phenol compound having a melting point of 130° C. or more and 200° C. or less. The melting point is still more preferably 150° C. or more and 170° C. or less. In the case where the melting point is less than the lower limit, this may increase the amount of sublimates during film formation. Meanwhile, the upper limit of the melting point is naturally defined according to the structure of the hindered phenol compound.

In addition, a vapor pressure of the alkylenebisamide-type hindered phenol is preferably 1×10E-10 Pa or less at 20° C., still more preferably 1×10E-11 Pa or less, and particularly preferably 5×10E-12 Pa or less. When the vapor pressure is more than the upper limit, an increased amount of the stabilizer sublimes during the film formation process or the master-pellet preparation process, causing contamination in an evacuation step during the process. This may reduce work efficiency or increase the die contamination or the deposition on the film surface. Further, due to a decrease in evacuation capacity, the stabilizer may not be sufficiently dispersed.

The content of the phenolic stabilizer is preferably 0.01 wt % or more and 2 wt % or less, more preferably 0.1 wt % or more and 2 wt % or less, still more preferably 0.3 wt % or more and 1.5 wt % or less, and particularly preferably 0.5 wt % or more and 1.0 wt % or less. In the case where the content of the phenolic stabilizer is less than the lower limit, sufficient withstand voltage characteristics are not obtained. In the case where the content of the phenolic stabilizer is more than the upper limit, an improvement in the withstand voltage characteristics in proportion to the increase in the amount cannot be expected. In addition, a portion unreacted with a resin may cause the contamination of the die or the deposition of the sublimates on the film surface.

<Particles>
(Spherical Crosslinked Polymeric Resin Particles (A))

It is preferable that the biaxially oriented film for electrical insulation of the invention contains, in the substrate layer, spherical crosslinked polymeric resin particles (A) having an average particle size of 0.5 μm or more and 3.0 μm or less in an amount of 0.01 wt % or more and 1.5 wt % or less based on the weight of the substrate layer. When such particles are contained in the film, slidability and windability can be imparted to the film without reducing the high withstand voltage characteristics given by the addition of the alkylenebisamide-type hindered phenol of the invention. Meanwhile, in the case where no spherical crosslinked polymeric resin particles (A) are contained, the slidability or the windability of the film may be insufficient. In addition, in the case where other particles are used in place of the spherical crosslinked polymeric resin particles (A), although the slidability and the windability are improved, the high withstand voltage characteristics given by the addition of the alkylenebisamide-type hindered phenol may be impaired.

The average particle size of the spherical crosslinked polymeric resin particles (A) is preferably 0.5 μm or more and 2.0 μm or less, and still more preferably 0.8 μm or more and 1.6 μm or less. When the average particle size of the spherical crosslinked polymeric resin particles (A) is less than the lower limit, the slidability and the windability of the film may be insufficient. In addition, in the case where the average particle size of the spherical crosslinked polymeric resin particles (A) is more than the upper limit, the withstand voltage characteristics may deteriorate. In particular, in film capacitor applications, breakdown voltage tends to decrease due to an increase in a space factor or increased insulation defects. Incidentally, as will be described in a measurement method, the average particle size in the invention is determined by the observation of particles in a film using a scanning electron microscope.

The content of the spherical crosslinked polymeric resin particles (A) is preferably 0.1 wt % or more and 1.5 wt % or less, and still more preferably 0.2 wt % or more and 1.0 wt % or less. When the content of the spherical crosslinked polymeric resin particles (A) is less than the lower limit, the slidability and the windability of the film may be insufficient. In addition, in the case where the content of the spherical crosslinked polymeric resin particles (A) is more than the upper limit, the film has a rough surface, leading to reduced chipping resistance, whereby the withstand voltage characteristics may deteriorate. In particular, in the film capacitor applications, the breakdown voltage tends to decrease due to the increase in the space factor or the increased insulation defects.

It is preferable that the shape of the spherical crosslinked polymeric resin particles (A) of the invention is substantially spherical or perfectly spherical. Specifically, it is preferable that the particle size ratio, which shows the degree of sphericity, is 1.0 or more and 1.3 or less. The particle size ratio herein is represented by a particle size ratio Dl/Ds defined by the ratio between an average major-axis size (Dl) and an average minor-axis size (Ds) of the spherical crosslinked polymeric resin particles. As will be described in the measurement method, the average major-axis size (Dl) and the average minor-axis size (Ds) are determined by the observation of particles in a film using the scanning electron microscope.

The particle size ratio of the spherical crosslinked polymeric resin particles (A) is still more preferably 1.0 or more and 1.2 or less, and particularly preferably 1.0 or more and 1.1 or less. When the particle size ratio is higher, the particle shape is less spherical. As a result, voids are likely to be formed around the particles, whereby the insulation defects tend to occur, and the withstand voltage characteristics tend to deteriorate.

It is preferable that the spherical crosslinked polymeric resin particles (A) have a sharp particle size distribution, and a relative standard deviation is preferably 0.5 or less, more preferably 0.4 or less, still more preferably 0.3 or less, and particularly preferably 0.2 or less. When the relative standard deviation is small and the particle size distribution is sharp, large projections on a film surface have uniform height, whereby the insulation defects are reduced, and the withstand voltage characteristics can be further improved.

It is preferable that the spherical crosslinked polymeric resin particles (A) are surface-treated with a silane coupling agent. When the surface is treated with the silane coupling agent, the withstand voltage characteristics can be further improved.

Examples of the silane coupling agents for the surface treatment include vinyltriethoxysilane, vinyltrichlorosilane, vinyltris(β-methoxyethoxy) silane, and the like having an unsaturated bond; amino silanes such as N-(β-aminoethyl)-γ-aminopropylmethyldimethoxysilane, N-(β-aminoethyl)-γ-aminopropyltrimethoxysilane, γ-aminopropyltrimethoxysilane, γ-aminopropyltriethoxysilane, and N-phenyl-γ-aminopropyltrimethoxysilane; epoxy silanes such as β-(3,4-epoxycyclohexyl)ethyltrimethoxysilane, γ-glycidoxypropyltrimethoxysilane, γ-glycidoxypropylmethyldietoxysilane, and γ-glycidoxypropyltriethoxysilane; methacrylate silanes such as γ-methacryloxypropylmethyldimethoxysilane, γ-methacryloxypropyltrimethoxysilane, γ-methacryloxypropylmethyldiethoxysilane, and γ-methacryloxypropyltriethoxysilane; γ-mercaptopropyltrimethoxysilane; and γ-chloropropyltrimethoxysilane.

Among these, the silane coupling agents containing the epoxy silane are preferable because they are easy to handle and unlikely to cause coloring when added, etc. The surface treatment method using the silane coupling agent may be a known method, such as a method in which particles are formed into a slurry with water or an organic solvent having dispersed therein the silane coupling agent, followed by heating, and then the particles are separated, dried, and optionally heat-treated.

Examples of the spherical crosslinked polymeric resin particles (A) include silicone resin particles, polyacrylic resin particles, polystyrene resin particles, and acrylic-styrene copolymer resin particles. The silicone resin particles are particularly preferable.

The silicone resin particles are preferably particles of a silicone resin having a bonding unit represented the following formula (I):

[Chemical Formula 1]

$$RSiO_{3/2} \qquad (1)$$

(wherein R is at least one member selected from $C_{1-6}$ alkyl groups and a phenyl group) in an amount of 80 wt % or more based on the silicone resin amount.

Examples of the alkyl groups for R in the above formula (I) include a methyl group, an ethyl group, a propyl group, a butyl group, a pentyl group, and a hexyl group. They may be used alone, and it is also possible to use one or more kinds. Among these, particles of a silicone resin wherein R is a methyl group (polymethylsilsesquioxane) are particularly particles in terms of the ease of synthesis, etc.

The silicone resin particles can be produced according to a known production method, such as a method in which an organotrialkoxysilane is hydrolyzed and condensed (JP-B-40-14917, JP-B-2-22767, etc.) or a method for producing polymethylsilsesquioxane particles using methyltrichlorosilane as a starting material (Belgium Patent No. 572412). The silicone resin particles in the invention are preferable because when they undergo polymerization in the presence of a surfactant, particles with few coarse projections are formed. The surfactants are not particularly limited, and preferred examples thereof include polyoxyethylene alkyl ethers, polyoxyethylene alkyl phenyl ethers, and alkylbenzene sulfonates.

In the invention, when the spherical crosslinked polymeric resin particles (A), particularly the silicone resin particles surface-treated with the silane coupling agent, are used, the slidability and the windability can be imparted to the film without reducing the high withstand voltage characteristics given by the addition of the alkylenebisamide-type hindered phenol of the invention; its mechanism is not clear, but is presumably as follows. Because of the spherical shape, the voids, which cause the insulation defects, are unlikely to be formed around the particles. In addition, the silane coupling agent adheres to the particles, whereby the affinity between the particles and the resin is improved, suppressing the formation of the voids, which cause the insulation defects, at the time of stretching. Further, in addition to the affinity with the film owing to the use of the silicone resin particles, for example, the following may also be the reason. The silicone resin particles are easily deformed by pressing in the capacitor production process, suppressing the formation of the voids due to pressing. Further, the coarse particles, which cause the insulation defects, are present in a smaller amount.

(Inert Particles (B))

It is preferable that the biaxially oriented film for electrical insulation of the invention contains, in the substrate layer, in addition to the spherical crosslinked polymeric resin particles (A), inert particles (B) having an average particle size of 0.01 μm or more and less than 0.5 μl in an amount of 0.05 wt % or more and 2.0 wt % or less based on the weight of the substrate layer, the average particle size of the inert particles (B) being at least 0.4 μm smaller than the average particle size of the spherical crosslinked polymeric resin particles (A). When the small inert particles (B) are further contained in addition to the spherical crosslinked polymeric resin particles (A), the slidability and the windability can be imparted to the film more efficiently without reducing the high withstand voltage characteristics given by the addition of the alkylenebisamide-type hindered phenol of the invention. Further, the film can be provided with excellent chipping resistance.

It is preferable that the average particle size of the inert particles (B) is smaller than the average particle size of the spherical crosslinked polymeric resin particles (A), and the difference therebetween is preferably 0.4 μm or more. The difference is still more preferably 0.5 μm or more, and particularly preferably 0.7 μm or more. In addition, the difference in the average particle size between the spherical crosslinked polymeric resin particles (A) and the inert particles (B) is preferably up to 2.5 μm, more preferably 2.0 μm or less, still more preferably 1.5 μm or less, and particularly preferably 1.0 μm or less.

When the difference in the average particle size between the spherical crosslinked polymeric resin particles (A) and the inert particles (B) is within such a range, the slidability and the windability can be more efficiently improved, and further the excellent chipping resistance can be obtained.

The average particle size of the inert particles (B) is preferably 0.01 μm or more and less than 0.5 μm, and still more preferably 0.1 μm or more and 0.4 μm or less. When the average particle size of the inert particles (B) is less than the lower limit, the improving effect on the slidability or the windability may not be sufficiently exhibited. In addition, in the case where the average particle size of the inert particles (B) is more than the upper limit, the effect on the chipping resistance may not be sufficiently exhibited, and the withstand voltage characteristics may deteriorate. Incidentally, as will be described in the measurement method, the average particle size in the invention is determined by the observation of particles in a film using the scanning electron microscope.

The content of the inert particles (B) is preferably 0.05 wt % or more and 2.0 wt % or less, still more preferably 0.1 wt. % or more and 0.6 wt % or less, and particularly preferably 0.2 wt % or more and 0.4 wt % or less based on the weight of the substrate layer. When the content of the inert particles (B) is less than the lower limit, the improving effect on the film slidability or windability may not be sufficiently exhibited. In addition, in the case where the content of the inert particles (B) is more than the upper limit, the film has a rough surface, leading to reduced chipping resistance. As a result, the withstand voltage characteristics may deteriorate.

With respect to the kind of the inert particles (B), it is most preferable to use spherical crosslinked polymeric resin particles (B1). In such a case, with respect to the kind, particle size ratio, relative standard deviation, and particle surface treatment of the spherical crosslinked polymeric resin particles (B1), it is preferable that the preferred ranges for the spherical crosslinked polymeric resin particles (A) are applied to the spherical crosslinked polymeric resin particles (B1).

The kind of the inert particles (B) may be different from the spherical crosslinked polymeric resin particles (A) in terms of being capable of imparting functions different from those imparted by the spherical crosslinked polymeric resin particles (A). Examples thereof include (1) silicon dioxide (including hydrates, quartz sand, quartz, etc.); (2) various crystal forms of alumina; (3) silicates having a $SiO_2$ component content of 30 wt % or more (e.g., amorphous or crystalline clay minerals, aluminosilicates (including calcined products and hydrates), chrysotile, zircon, fly ash, etc.); (4) oxides of Mg, Zn, Zr, and Ti; (5) sulfates of Ca and Ba; (6) phosphates of Li, Ba, and Ca (including monohydrogen salts and dihydrogen salts); (7) benzoates of Li, Na, and K; (8) terephthalates of Ca, Ba, Zn, and Mn; (9) titanates of Mg, Ca, Ba, Zn, Cd, Pb, Sr, Mn, Fe, Co, and Ni; (10) chromates of Ba and Pb; (11) carbon (e.g., carbon black, graphite, etc.); (12) glass (e.g., glass powder, glass beads, etc.); (13) carbonates of Ca and Mg; (14) fluorite; and (15) spinel-type oxides. Among particles different from the spherical crosslinked polymeric resin particles (A), calcium carbonate particles and spherical silica particles are preferable in terms of providing the excellent slidability and chipping resistance.

The method for incorporating the various particles used in the invention into a film is not particularly limited. Examples thereof include a method in which the particles are added or deposited in any stage of resin polymerization and a method in which they are added in any stage of melt extrusion. It is also possible to use a dispersant, a surfactant, or the like in order to achieve effective dispersion.

<Fullerenes>

In the biaxially oriented film for electrical insulation of the invention, the substrate layer may contain a fullerene in an amount of 0.01 wt % or more and 1 wt % or less based on the weight of the substrate layer. In the film of the invention, when the fullerene is used together with the phenolic stabilizer of the invention, the withstand voltage characteristics can be further enhanced, and stretching properties are also improved.

Examples of such fullerenes include fullerenes, fullerene derivatives, and mixtures thereof. The fullerenes are spherical or elliptical carbon molecules, and are not limited as long as the object of the invention is satisfied. Examples thereof include $C_{60}$, $C_{70}$, $C_{74}$, $C_{76}$, $C_{78}$, $C_{80}$, $C_{82}$, $C_{84}$, $C_{86}$, $C_{88}$, $C_{90}$, $C_{92}$, $C_{94}$, $C_{96}$, $C_{98}$, $C_{100}$, and dimers and trimers of these compounds.

In the invention, among the fullerenes mentioned above, it is preferable to use at least one member selected from the group consisting of $C_{60}$, $C_{70}$, and dimers and trimers thereof. $C_{60}$ and $C_{70}$ are particularly preferable because they are industrially easily available and also have high dispersibility in a resin. It is also possible to use two or more kinds of these fullerenes together. In the case where a plurality of fullerenes are used together, it is preferable to use $C_{60}$ and $C_{70}$ together.

The fullerene derivative in the invention refers to a compound in which an atomic group forming a part of an organic compound or an atomic group of inorganic elements is attached to at least one carbon of the fullerene. The fullerene derivative can be used like the fullerene as long as film-forming properties are not impaired, and this may enhance the dispersibility of the fullerene. Examples of the fullerene derivatives include fullerene hydrides, fullerene oxides, fullerene hydroxides, and fullerene halides (F, Cl, Br, I). The fullerene derivative may contain a substituent such as a carboxyl group, an alkyl group, or an amino group.

In the case where the film of the invention contains the fullerenes in the substrate layer, the lower limit of the content is preferably 0.01 wt %, still more preferably 0.05 wt %, based on the weight of the substrate layer. When the fullerene content is less than the lower limit, the radical-trapping effect may not be sufficiently exhibited.

Meanwhile, in the case where the fullerene is used, the content is limited to 1 wt % or less. When the fullerene content is more than the upper limit, breakdown voltage characteristics may deteriorate.

<Other Additives>

The biaxially oriented film for electrical insulation of the invention may further contain a small amount of at least one member selected from the group consisting of sulfur stabilizers and phosphorus stabilizers. The use of these stabilizers together with the phenolic stabilizer of the invention can also enhance the withstand voltage characteristics.

Examples of the sulfur stabilizers include thioether compounds, specifically tetraester-type polymeric thioether compounds.

Examples of the phosphorus stabilizers include phosphonic acid, phosphate compounds, and phosphite compounds. Among these, various kinds of phosphite compounds are usable.

When such sulfur stabilizers and phosphorus stabilizers are used together with the phenolic stabilizer, the withstand voltage characteristics can be further enhanced. Meanwhile, even when a large amount is added, the addition of such an amount creates no synergy. Therefore, it is preferable to add a minimum amount. The content of these stabilizers is preferably 0.0001 to 1 wt %, still more preferably 0.0005 to 0.5 wt %, based on the weight of the substrate layer. When the stabilizer content is less than the lower limit, the synergetic effect may not be sufficiently exhibited on the withstand voltage characteristics. Meanwhile, when the stabilizers are added to a content higher than the upper limit, the addition of such an amount creates no synergy. Not only that, the heat resistance of the crystalline thermoplastic resin may be reduced, for example.

<Withstand Voltage Characteristics>

The withstand voltage characteristics of the biaxially oriented film for electrical insulation of the invention are evaluated based on the breakdown voltage. The biaxially oriented film for electrical insulation of the invention preferably has a breakdown voltage of 450 V/μm or more at 25° C., more preferably 460 V/μm or more, still more preferably 470 V/μm or more, particularly preferably 480 V/μm or more, and most preferably 500 V/μm or more. In the case where the breakdown voltage is less than the lower limit, electrical characteristics may be insufficient when the film is used as an electrically insulating material for electric cars and hybrid cars, for example, where enhanced withstand voltage characteristics are required. Meanwhile, although a higher breakdown voltage at 25° C. leads to higher reliability when used as such an electrically insulating material, and thus is more desirable, the upper limit is naturally defined according to the nature of the resin material, and is usually 700 V/μm or less.

Such withstand voltage characteristics are achieved by the use of the alkylenebisamide-type hindered phenol of the invention. In the case where particles are added to further impart the slidability and the windability, they are achieved by the use of the spherical crosslinked polymeric resin particles (A) of the invention and also the inert particles (B) of the invention as the particles. In the case where a polyester is used as the crystalline thermoplastic resin, the withstand voltage characteristics can be further enhanced by the use of a titanium compound as a catalyst. In addition, as a way to further improve the withstand voltage characteristics, the combined use of the alkylenebisamide-type hindered phenol and the fullerenes of the invention is mentioned.

As will be described in detail in the measurement method, the breakdown voltage at 25° C. herein is a value measured according to a plate electrode technique described in JIS C2151 using an apparatus ITS-6003 manufactured by Tokyo Seiden at a voltage rise rate of 0.1 kV DC/s.

It is also preferable that the biaxially oriented film for electrical insulation of the invention is such that the average breakdown voltage of the film at 25° C. obtained from 50 measurements is 450 V/μm or more with a standard deviation of 20 V/μm or less. With respect to the variation of breakdown voltage, the standard deviation is more preferably 18 V/μm or less, still more preferably 16 V/μm or less, and particularly preferably 15 V/μm or less.

In the determination of the average and variation of breakdown voltage, each sample for measurement has a size of 10 cm×10 cm, and measurement is performed on each of 64 samples in total, including 8 samples in the film longitudinal direction×8 samples in the film transverse direction. From the obtained 64 measured values, first seven largest data and first seven smallest data are subtracted, and the average and variation are determined from the resulting 50 measured values. Incidentally, the measurement conditions and apparatus are as mentioned above.

In the case where the film contains a large amount of the phenolic stabilizer, although the breakdown voltage characteristics are improved as compared with a film that does not contain the stabilizer, the variation of the breakdown voltage may increase. In addition, when the film thickness is small, the variation of the breakdown voltage tends to increase with an increase in the breakdown voltage of the film. In the case where the variation of the breakdown voltage is large, a breakdown occurs in a region with the lowest breakdown voltage. Therefore, even when the average breakdown voltage is high, this does not necessarily indicate high performance.

Accordingly, when the average breakdown voltage of the film is high with an extremely low standard deviation, in the case where the film is used as an electrically insulating member for a film capacitor or the like, the reliability of the member can be enhanced. That is, a decrease in the variation of the breakdown voltage suppresses a decrease in a minimum breakdown voltage, and also leads to an increase in the average breakdown voltage. Meanwhile, in the case where the variation of the breakdown voltage is more than 20 V/μm, a breakdown occurs in a region with the lowest breakdown voltage. Therefore, even when the average breakdown voltage is high, this does not necessarily indicate high performance. Specifically, the minimum breakdown voltage in 50 measurements is preferably more than 430 V/μm, and still more preferably 450 V/μm.

<Refractive Index in Thickness Direction nz of Substrate Layer>

In the invention, as a method for increasing the average breakdown voltage while decreasing its variation, the following method is mentioned: the substrate layer contains the phenolic stabilizer mentioned above, and a refractive index in the thickness direction nz of the substrate layer is more than 1.505. In addition, as a method for obtaining such refractive index characteristics, the following method is mentioned: an edge pinning method is employed as an electrostatic application technique during the film formation process.

When the edge pinning method is employed as the electrostatic application technique in place of a conventional wire pinning method, the refractive index in the thickness direction of the substrate layer is increased, and the average breakdown voltage can be increased.

When the edge pinning method is employed, the refractive index in the film thickness direction can be kept high even when the film draw ratio is increased to more than 3.0. Further, when the draw ratio is more than 3.0, the uniformity of the film can be increased. Therefore, together with an improvement in the breakdown voltage, the decrease in the variation of the breakdown voltage can also be achieved.

The reason why the increase in the refractive index in the thickness direction of the substrate layer leads to the increase in the breakdown voltage is not clear, but is presumably that strength in the thickness direction is increased, and this reduces the likelihood of dynamic breakdown in the thickness direction due to external electric charge.

In the case where a polyester is used as a main crystalline thermoplastic resin of the substrate layer, the refractive index in the thickness direction nz of the substrate layer is preferably more than 1.505, still more preferably 1.508 or more, and particularly preferably 1.510 or more. Within this range, it is more desirable for the substrate layer to have a higher refractive index in the thickness direction nz. However, in the case of a polyester, the upper limit of the refractive index nz is defined by the nature of the polymer, and is 1.550 or less, further 1.520 or less, and particularly 1.515 or less. In order to further increase the refractive index in the thickness direction nz of the substrate layer, in addition to employing the edge pinning method, it is necessary to suppress stretching as much as possible. Thus, when the refractive index nz is more than the upper limit, although the average breakdown voltage can be increased, it may have increased variation.

In the production of a film having such refractive index characteristics and breakdown voltage characteristics, a film merely having the refractive index characteristics in the thickness direction can be obtained by a method using the wire pinning method as the electrostatic application technique and employing a reduced draw ratio in the subsequent step. However, in the case where the wire pinning method is employed, in order to obtain a refractive index in the thickness direction of more than 1.505, stretching is performed at a low draw ratio of 3.0 or less. As a result, it is difficult to achieve a uniform film, and the variation of the breakdown voltage may increase in a high withstand voltage region. In contrast, in the case where the substrate layer contains the phenolic stabilizer as an essential component, and the edge pinning method is employed as the antistatic application technique, even when the film draw ratio is increased, the film uniformity can be increased while keeping the high refractive index in the film thickness direction, and the variation of the breakdown voltage can be further reduced.

<Laminate Structure>
(Substrate Layer)

The biaxially oriented film for electrical insulation of the invention is a film having at least one layer including the substrate layer that is made of the crystalline thermoplastic resin as a main component and contains the alkylenebisamide-type hindered phenol. The "main component" herein means that its content is 80 wt % or more based on the weight of the substrate layer. The content is preferably 85 wt % or more, more preferably 90 wt % or more, still more preferably 95 wt % or more, particularly preferably 97 wt % or more, and most preferably 99 wt % or more.

In addition to the crystalline thermoplastic resin and the alkylenebisamide-type hindered phenol, the substrate layer may also contain the spherical crosslinked polymeric resin particles (A), the inert particles (B), the fullerene, the compatibilizer, etc.

The thickness of the substrate layer is preferably 0.1 to 20 μm, more preferably 0.2 to 15 μm, and still more preferably 0.5 to 15 μm. When the thickness of the substrate layer is less than the lower limit, the formation of the film may be difficult, and also sufficient withstand voltage characteristics may not be exhibited. Meanwhile, when the thickness of the substrate layer is more than the upper limit, it may be difficult to reduce the size of the electrically insulating part for film capacitors or for motor insulation, for example.

In addition, when the film is used for the film capacitor, for example, it is preferable that the substrate layer thickness is small, preferably 0.2 μm or more and 5 μm or less. In thin applications, when the standard deviation of the breakdown voltage mentioned above is satisfied in addition to the average breakdown voltage characteristics, reliability as a film for electrical insulation can be further enhanced.

(Coating Layer)

It is preferable that the biaxially oriented film for electrical insulation of the invention further includes a coating layer on one side or both sides of the substrate layer. It is preferable that the coating layer contains at least one member selected from the group consisting of waxes, silicone compounds, and fluorine compounds in an amount of 1 to 50 wt % based on the weight of the coating layer. When the coating layer contains at least one of these compounds, its adhesion to a metal layer stacked via the coating layer is reduced. Accordingly, when a breakdown occurs at a defect site in the film, causing short-circuit conditions, the metal layer near the defect site is easily scattered by a short-circuit current. As a result, even better self-healing properties than before can be obtained. Meanwhile, in the case where the coating layer contains no such compound, the coating layer does not have sufficient detachability, and, therefore, its adhesion to the metal layer cannot be reduced. Accordingly, when the breakdown occurs at the defect site in the film, causing the short-circuit conditions, the metal layer near the defect site cannot be easily scattered by the short-circuit current. As a result, sufficient self-healing properties may not be exhibited.

(Wax in Coating Layer)

Examples of the waxes for the coating layer include polyolefin waxes and ester waxes, as well as natural waxes such as carnauba wax, candelilla wax, and rice wax. Examples of the polyolefin waxes include polyethylene wax and polypropylene wax. Examples of the ester waxes include ester waxes containing a $C_8$ or higher aliphatic monocarboxylic acid and a polyalcohol. Specific examples thereof include sorbitan tristearate, pentaerythritol tribehenate, glycerol tripalmitate, and polyoxyethylene distearate. Among these waxes, it is preferable to use the polyolefin wax in terms of obtaining higher self-healing properties. It is also preferable to use such a wax in the form of an emulsion in terms of good dispersibility in the coating layer.

(Silicone Compound in Coating Layer)

As the silicone compound for the coating layer, it is preferable to use a silicone compound having a reactive group. In the case where silicone having no reactive group is used, the coating layer may be chipped, and when the short-circuit conditions occur in the substrate layer, the metal layer at the portion having no coating layer cannot be easily scattered from the substrate layer. As a result, the sufficient self-healing properties may not be exhibited.

Preferred examples of the silicone compounds having the reactive group include those having a reactive group directly attached to a silicon atom and having at least one reactive group selected from the group consisting of amino-group-containing organic groups, epoxy-group-containing organic groups, carboxylic-acid-group-containing organic groups, a silanol group, and organic groups that produce the silanol group through hydrolysis. The reaction groups of the silicone are as follows, for example. Examples of the amino-group-containing organic groups include primary aminoalkyl groups, such as a 3-aminopropyl group, a 3-amino-2-methyl-propyl group, and a 2-aminoethyl group, and organic groups having primary and secondary amino groups, such as an N-(2-aminoethyl)-3-aminopropyl group and an N-(2-aminoethyl)-2-aminoethyl group.

Examples of the epoxy-group-containing organic groups include glycidoxyalkyl groups such as a γ-glycidoxypropyl group, a β-glycidoxyethyl group, and a γ-glycidoxy-β-methyl-propyl group and glycidoxycarbonyl alkyl groups such as a 2-glycidoxycarbonyl-ethyl group and a 2-glycidoxycarbonyl-propyl group.

Examples of the organic groups that produce the silanol group through hydrolysis include alkoxy groups such as a methoxy group, an ethoxy group, a butoxy group, and a 2-ethylhexyloxy group, alkoxy-β-ethoxy groups such as a β-methoxyethoxy group, a β-ethoxy ethoxy group, and a butoxy-β-ethoxy group, acyloxy groups such as an acetoxy group and a propoxy group, N-alkylamino groups such as a methylamino group, an ethylamino group, and a butylamino group, N, N-dialkylamino groups such as a dimethylamino group and a diethylamino group, and nitrogen-containing heterocyclic groups such as an imidazole group and a pyrrole group.

The silicone compound may also be a mixture of silicone compounds having different kinds of reactive groups. It is preferable that such a silicone compound has a molecular weight of 1000 to 500000. When it is less than 1000, cohesive strength of the coating film decreases, whereby the coating layer may be easily chipped. When it is more than 500000, viscosity increases, possibly leading to poor handleability.

(Fluorine Compound in Coating Layer)

Examples of the fluorine compounds for the coating layer include polymers obtained from fluoroethylene monomers and polymers obtained from alkyl(meth)acrylate fluoride monomers. Examples of the (co)polymers obtained from fluoroethylene monomers include (co)polymers of tetrafluoroethylene, trifluoroethylene, difluoroethylene, monofluoroethylene, difluorodichloroethylene, etc.

(Content)

It is preferable that the content of at least one member selected from the group consisting of the waxes, the silicone compounds, and the fluorine compounds in the coating layer is 1 to 50 wt % based on the weight of the coating layer. The content of these compounds is still more preferably 10 to 50 wt %. In the case where the content is less than the lower limit, the adhesion between the substrate layer and the metal layer via a release layer is high. Accordingly, when the breakdown occurs at the defect site in the film, causing the short-circuit conditions, the metal layer near the defect site cannot be easily scattered by the short-circuit current. As a result, the sufficient self-healing properties may not be obtained. Meanwhile, in the case where the content is more than the upper limit, the release properties of the coating layer are too high, and the metal layer is thus prone to detachment. As a result, the metal layer may be easily detached at the time of processing such as winding, resulting in defective products.

(Other Additives in Coating Layer)

The coating layer may additionally contain a surfactant, a crosslinking agent, a lubricant, etc.

The surfactant is used to enhance the wettability of an aqueous coating liquid to the substrate layer or to improve the stability of the coating liquid. Examples thereof include anionic and nonionic surfactants such as polyoxyethylene-fatty acid esters, sorbitan fatty acid esters, glycerine fatty acid esters, fatty acid metallic soaps, alkyl sulfates, alkyl sulfonates, and alkyl sulfosuccinates. It is preferable that the surfactant is contained in an amount of 1 to 60 wt % based on the weight of the coating layer.

In addition, it is preferable to add the crosslinking agent because the cohesive strength of the coating layer can be thereby improved. Examples of the crosslinking agents include epoxy compounds, oxazoline compounds, melamine compounds, and isocyanate compounds. Other coupling agents are also usable. The amount of the crosslinking agent added is preferably 5 to 30 wt % based on the weight of the coating layer.

The thickness of the coating layer is preferably 0.005 to 0.5 μm, still more preferably 0.005 to 0.2 μm, as dry thickness. In the case where the thickness of the coating layer is less than the lower limit, the self-healing properties may not be sufficiently exhibited. In addition, even when the thickness of the coating layer is increased to exceed the upper limit, no further self-healing properties may be obtained.

(Metal Layer)

The biaxially oriented film for electrical insulation of the invention may include the metal layer stacked on at least one side of the substrate layer. Materials for the metal layer are not particularly limited, and examples thereof include aluminum, zinc, nickel, chromium, tin, copper, and alloys thereof. Further, such a metal layer may be slightly oxidized. In addition, for the ease of the metal layer formation, the metal layer is preferably a deposited metal layer formed by deposition.

In stacking the metal layer, when the metal layer is provided on the coating layer of the invention, moderate adhesion is obtained between the substrate layer and the metal layer. Thus, in the production of the film capacitor, at the time of processing such as winding, the metal layer is not detached. Meanwhile, when the breakdown occurs at the defect site in the film, causing the short-circuit conditions, even better self-healing properties than before can be obtained. In addition, in the case where the metal layer is provided on both sides of the biaxially oriented film for electrical insulation of the invention, when a method that forms the metal layers simultaneously on the both sides, such as double-sided deposition, is employed, the metal layer can be provided through a reduced number of steps.

<Phenolic Stabilizer Addition Method>

In the invention, the method for adding the phenolic stabilizer may be either a method in which addition is performed during the resin polymerization or a method in which addition is performed during the film formation process or the master-pellet preparation process, and it is preferable to employ the method in which addition is performed during the film formation process or the master-pellet preparation process. The alkylenebisamide-type hindered phenol of the invention is a stabilizer with low sublimability, and is characterized in that even when it is added during the film formation process or the master-pellet preparation process, die contamination or sublimate deposition is likely to be reduced. In particular, in the case where the alkylenebisamide-type hindered phenol is applied to a polyester resin, because it tends to be chemically bonded to a polyester during the film formation process or the master-pellet preparation process, addition is preferably performed during the film formation process or the master-pellet preparation process.

Even when the alkylenebisamide-type hindered phenol of the invention is added during polymerization, the deposition of the sublimates tends to be reduced, whereby the die contamination or the sublimate deposition during the subsequent film formation process tends to be reduced. Meanwhile, in the case where the alkylenebisamide-type hindered phenol of the invention is applied to the polyester resin, it tends to be chemically bonded to the polyester even during the polymerization process. Therefore, although it does not cause a crosslinking reaction like the pentaerythritol-type hindered phenol, the polymerization degree of the resulting polymer may be affected, and, in some cases, film-forming properties may be affected.

The following will describe the details of 1) the method of addition during the master-pellet preparation process and 2) the method of addition during the film formation process.

The method of addition during the master-pellet preparation process 1) may be a method in which polymerized resin chips and the phenolic stabilizer are previously melt-kneaded in a twin-screw kneader to produce master pellets. Examples of such methods are a method in which a predetermined amount of the phenolic stabilizer is added to a solid resin, they are mixed, and then the mixture is melt-knead in the twin-screw kneader; a method in which a resin is melted, then a predetermined amount of the phenolic stabilizer is added, and the mixture is melt-knead in the twin-screw kneader; etc. In such a case, the phenolic stabilizer may be directly added, and it is also possible to previously prepare a master polymer and then add the same. The obtained master pellets can be blended with resin chips in a predetermined ratio and used in the film formation process of 2). It is preferable that the concentration of the phenolic stabilizer in the master polymer is 0.5 to 10 wt %. In the case where the concentration of the stabilizer is less than the lower limit, the amount of the master polymer incorporated increases, which may reduce efficiency. Meanwhile, in terms of production, it may be difficult to produce the master polymer to a concentration that exceeds the upper limit.

The method of addition during the film formation process 2) is a method in which polymerized resin chips are previously mixed with a powder of the phenolic stabilizer, and the mixture is added through a feed inlet of an extruder for the film formation and melt-kneaded in the extruder. In this case, as in the method 1), the phenolic stabilizer may be used in the form of the powder, or may also be used in the form of the master polymer previously prepared in the method 1).

<Film Formation Method>

Hereinafter, a method for obtaining the biaxially oriented film of the invention will be described in detail. However, the method is not particularly limited to the following example.

(Preparation of Unstretched Film)

The phenolic stabilizer is added to the crystalline thermoplastic resin by any of the addition methods mentioned above, and a film raw material is fed to an extruder. The melt obtained by melt-kneading in the extruder is extruded through a T-die, and then cooled and solidified into a sheet on a cooling drum. At the time when the sheet-shaped product extruded through the T-die is brought into close contact with a cooling roll, it is preferable to apply static electricity. As methods for such electrostatic application, the pinning wire method and the edge pinning method are mentioned, for example.

In the invention, in order to obtain the refractive index characteristics in the thickness direction, it is preferable to use the edge pinning method. Specifically, a technique in which static electricity is applied to both ends of the sheet-shaped product extruded through the die using a needle-shaped edge pinning apparatus is mentioned. It is also possible to employ a technique using an air nozzle, an air chamber, or the like or a technique using a suction chamber instead of the needle-shaped edge pinning apparatus. Further, it is also possible to use the technique using the air nozzle, the air chamber, or the like or the technique using the suction chamber in combination to support the electrostatic application technique using the needle-shaped edge pinning apparatus.

Using the edge pinning method, the sheet-shaped product is brought into close contact with the cooling roll controlled to a surface temperature of 40 to 90° C., and the sheet-shaped product in molten state is cooled and solidified to obtain an unstretched film. The use of the edge pinning method makes it possible to obtain a film that satisfies the refractive index in the film thickness direction, the average breakdown voltage, and the variation of the breakdown voltage, which is a preferred embodiment of the invention.

(Stretching Process)

Next, the unstretched film is heated by roll heating or infrared heating, for example, and then stretched in the longitudinal direction to give a longitudinally stretched film. The longitudinal stretching is preferably performed utilizing the difference in peripheral speed between two or more rolls. The longitudinal stretching temperature is preferably higher than a glass transition temperature (Tg) of the resin, and still more preferably 20 to 40° C. higher than Tg. The longitudinal draw ratio may be adjusted according to the requirements of the intended use, and is preferably 2.5 or more and 5.0 or less, and still more preferably 3.0 or more and 4.5 or less. In the case where the longitudinal draw ratio is less than the lower limit, the unevenness of film thickness may be reduced, making it impossible to obtain an excellent film. In addition, in the case where the longitudinal draw ratio is more than the upper limit, rupture tends to occur during the formation of a film.

In addition, in order to particularly reduce the variation of the film breakdown voltage, it is preferable to perform the longitudinal stretching at a draw ratio of more than 3.0. The longitudinal stretching is still more preferably performed at a draw ratio of more than 3.0 and 5.0 or less, and particularly preferably more than 3.0 and 4.5 or less.

Next, the obtained longitudinally stretched film is transversely stretched, and then optionally successively heat-set and heat-relaxed to form a biaxially oriented film. These treatments are performed while running the film. The transverse stretching treatment is started at a temperature that is at least 20° C. higher than the glass transition temperature (Tg) of the resin, and continued while raising the temperature to a temperature (120 to 30)° C. lower than a melting point (Tm) of the resin. The highest transverse stretching temperature is preferably (100 to 40)° C. lower than the melting point of the resin. When the starting temperature in the transverse stretching is too low, the film tends to break. In addition, in the case where the highest temperature in the transverse stretching is too low, the resulting film has an increased heat shrinkage rate, and physical properties tend to be less uniform in the width direction.

The rise of temperature during the transverse stretching process may be continuous or stepwise (sequential), but the temperature is usually raised stepwise. For example, a transverse stretching zone of a stenter is divided into several sections along the film running direction, and a heating medium having a predetermined temperature is poured into each zone to raise the temperature.

The transverse draw ratio may be adjusted according to the requirements of the intended use, and is preferably 2.5 or more and 5.0 or less, and still more preferably 3.0 or more and 4.5 or less. In the case where the transverse draw ratio is less than the lower limit, the unevenness of film thickness may be reduced, making it impossible to obtain an excellent film. In addition, in the case where the transverse draw ratio is more than the upper limit, rupture tends to occur during the formation of a film.

In addition, in order to particularly reduce the variation of the film breakdown voltage, it is preferable to perform the transverse stretching at a draw ratio of more than 3.0. The transverse stretching is still more preferably performed at a draw ratio of more than 3.0 and 5.0 or less, and particularly preferably more than 3.0 and 4.5 or less.

(Heat Treatment)

The biaxially stretched film is then optionally subjected to a heat set treatment. The heat set treatment makes it possible to increase the dimensional stability of the obtained film under high-temperature conditions.

In the case where the biaxially oriented film of the invention is a polyethylene naphthalene dicarboxylate film, the heat shrinkage rate at 200° C. is preferably −3 to 3%, still more preferably −2 to 2%, and particularly preferably −1 to 1%. In the case where the heat shrinkage rate at 200° C. does not satisfy the above range, when a metal film is deposited on the film to produce a laminate film for use as a film capacitor, deformation may occur or the self-healing properties may deteriorate upon heat-treating the capacitor. In order for the heat shrinkage rate at 200° C. to be within the above range, the heat set treatment is preferably performed at a temperature of (Tm—100° C.) or more, and still more preferably (Tm—70)° C. to (Tm—40)° C.

The biaxially oriented film of the invention may further be annealed to suppress heat shrinkage in an offline process. For example, in the case of the polyethylene naphthalene dicarboxylate film, the film may be heat-treated at 150 to 220° C. for 1 to 60 seconds and then annealed in an atmosphere having a temperature of 50 to 80° C.

(Formation of Coating Layer)

In the case where the coating layer is to be provided, coating may be performed during the film stretching process. In such a case, it is preferable that a coating liquid is used in the form of an aqueous coating liquid. The solids content of the aqueous coating liquid is usually 20 wt % or less, and preferably 1 to 10 wt %. "Aqueous" herein includes aqueous solutions, aqueous dispersions, liquid emulsions, and like conditions.

The aqueous coating liquid may be applied to a film in any stage. It is preferably applied during the process of film production, and still more preferably applied to a film before the completion of oriented crystallization. The films before the completion of crystal orientation herein include an unstretched film, a uniaxially oriented film obtained by orienting the unstretched film in either the longitudinal direction or the transverse direction, a film oriented by stretching both in the longitudinal direction and the transverse direction at low ratios (a biaxially oriented film before eventual re-stretching in the longitudinal direction or the transverse direction to complete oriented crystallization), etc. It is particularly preferable that the aqueous coating liquid for a coating layer is applied to the unstretched film or a uniaxially stretched film oriented in one direction, and the film is then directly stretched longitudinally and/or transversely and heat-set.

When the aqueous coating liquid is applied to the film, as a pretreatment for improving application properties, the film surface may be subjected to a physical treatment such as a corona surface treatment, a flame treatment, a plasma treatment, etc., and it is also possible to use, together with a coating layer composition, a surfactant that is chemically inert to the composition.

The application method may be any of known coating methods. For example, roll coating, gravure coating, roll brushing, spray coating, air knife coating, impregnation, curtain coating, and the like may be used alone or in combination.

The coating layer of the invention may also be formed in a separate process after biaxially stretching the film.

<Use>

The biaxially oriented film of the invention has excellent withstand voltage characteristics, and thus is suitable as a film for electrical insulation. Specifically, it can be used as a base film for electrical insulation for film capacitors, motor insulating members such as wedge materials and slot materials, flexible printed circuit boards, flat cables, solar cells, and the like.

Among these electrical insulation applications, the film capacitor, for example, is obtained by winding or stacking a laminate film obtained by stacking the metal layer on one side or both sides of the biaxially oriented film of the invention.

The flexible printed circuit board is obtained by stacking the metal layer made of a copper foil or a conductive paste on at least one side of the biaxially oriented film of the invention and forming a fine circuit pattern in the metal layer.

The motor insulating member such as the wedge material or the slot material is obtained by deforming the biaxially oriented film of the invention using a punch with a rounded edge.

When the coating layer and the metal layer are stacked on the substrate layer, such a film has excellent self-healing characteristics, and thus is particularly suitable for electrical insulation for the film capacitors, for example.

In addition, a film having the refractive index characteristics in the film thickness direction of the invention, which is obtained using the edge pinning method, is effective in reducing the variation of the breakdown voltage in a thin film even when the withstand voltage is high. Therefore, such a film is particularly suitable as an insulating film for the film capacitors, where a thinner insulating film is required.

Meanwhile, in the case where a polyester is used as the thermoplastic resin, when a polyolefin, a polystyrene, or the like is further blended, such a film is excellent in suppressing self-heating in addition to having the withstand voltage characteristics and the film-forming properties of the invention. Therefore, the film is particularly suitable as an insulating film for the film capacitors, where the suppression of self-heating at high temperatures is required.

EXAMPLES

Hereinafter, the invention will be described in detail with reference to examples. However, the invention is not limited to these examples. Respective characteristic values were measured by the following methods. Unless otherwise noted, "part" and "%" in the examples are by weight.

(1) Phenolic Stabilizer Content

A substrate layer weighing 20 mg was dissolved in a 1:1 mixed solvent of deuterated trifluoroacetic acid and deuterated chloroform. The peak intensity due to hydrogen in a hydrocarbon chain between tert-butyl-4-hydroxyphenyl and an amide bond was obtained from 256 transients using a 600M $^1$H-NMR apparatus. Based on the NMR test results, in the case where the stabilizer had reacted with the resin, the content was calculated in terms of the original stabilizer. In the case where a stabilizer unreacted with the polymer and a stabilizer reacted with the polymer were both present, and a plurality of peak positions were detected from one hydrocarbon chain, the content was determined from the total thereof.

(2) Breakdown Voltage (2-i)

Using an obtained film sample, measurement was performed according to a plate electrode technique, which is one of the DC tests described in JIS C2151, using ITS-6003 manufactured by Tokyo Seiden at a voltage rise rate of 0.1 kV/sec, and the voltage at the point of breakdown was taken as the breakdown voltage. The measurement was performed where n=50, and the average was taken as the breakdown voltage. The measurement was performed at a room temperature of 25° C.

(2-ii)

In Table 3, in the determination of the average and standard deviation of the breakdown voltage, each sample for the measurement had a size of 10 cm×10 cm, and measurement was performed on each of 64 samples in total, including 8 samples in the film longitudinal direction×8 samples in the film transverse direction. From the measured values (n=64), first seven largest data and first seven smallest data were subtracted, and the average was determined from the values (n=50) as the breakdown voltage. The standard deviation was calculated based on the obtained 50 breakdown voltage values. Among the obtained 50 breakdown voltage values, the smallest value of the breakdown voltage was taken as the minimum. The measurement was performed at a room temperature of 25° C. Incidentally, the measurement method is based on the plate electrode technique of 2-i. Using the same apparatus and voltage rise rate, the voltage at the point of breakdown was taken as the breakdown voltage.

(2-iii)

Using an obtained film sample, breakdown voltage at 120° C. was measured according to JIS K6911 under the following conditions: specimen size: 10 cm×10 cm, upper electrode shape: spherical (φ=20 mm), lower electrode shape: 100 mm×100 mm×100 μm in thickness (made of stainless steel), voltage rise rate: 0.1 kV DC/sec, test atmosphere: in silicon oil (conforming to JIS c2320, insulating oil), test apparatus: withstand voltage tester TOS 5101 (manufactured by Kikusui Electronics). Measurement was performed at a temperature of 120° C. where n=3, and the average thereof was taken.

(3) tan δ (Dielectric Loss Tangent)

Using an obtained film sample, aluminum was deposited thereon according to JIS C2151. The film sample was then placed in a thermostat (manufactured by Ando Electric, TO-9), and the dielectric loss tangent (tan δ) at 1 kHz was determined with a 10° C. pitch from 30 to 180° C. using an LCR meter (HEWLETT PACKARD 4284A).

(4) Average Particle Size and Particle Size Ratio of Particles

A small piece of a film sample was fixed to a sample table for the scanning electron microscope. Using a sputtering apparatus manufactured by JEOL (ion-sputtering apparatus, JIS-1100), a film surface was ion-etched for 10 minutes in a vacuum of 0.13 Pa at 0.25 kV and 1.25 mA. Further, the film was gold-spattered in the same apparatus, and observed using the scanning electron microscope at a magnification of 10000 to 30000. Using Luzex 500 manufactured by Nippon Regulator, at least 100 particles were measured for an area-equivalent particle size (Di), a major-axis size (Dli), and a minor-axis size (Dsi). The obtained values were applied to the following equation (1) wherein n represents the number of particles, and the number average of the area-equivalent particle size (Di) was determined as an average particle size (D).

[Equation 1]

$$D = \frac{\left(\sum_{i=1}^{n} Di\right)}{n} \quad (1)$$

Similarly, the obtained values were applied to the following equations (2) and (3), and the average major-axis size (Dl) and the average minor-axis size (Ds) were determined. Dl/Ds was taken as the particle size ratio.

[Equation 2]

$$D1 = \frac{\left(\sum_{i=1}^{n} D1i\right)}{n} \quad (2)$$

[Equation 3]

$$Ds = \frac{\left(\sum_{i=1}^{n} Dsi\right)}{n} \quad (3)$$

(5) Particle-Size Relative Standard Deviation of Particles

From the area-equivalent particle size (Di) of each particle and the average particle size (D) determined by the measurement method (4), a relative standard deviation of particle size of the particles was determined using the following equation (4).

[Equation 4]

$$\text{Relative standard deviation} = \sqrt{\sum_{i=1}^{n} (Di - D)^2 / n} / D \quad (4)$$

(6) Refractive Index in Film Thickness Direction nz

Using a laser refractive index manufactured by Metricon, measurement was performed with a prism coupler (wavelength: 633 nm). A laser beam is applied through a prism to a sample that is in close contact with the prism, and the prism is rotated to change an incident angle to the sample. A light reflected by a sample surface was measured, and incident-angle dependence of the amount of light was monitored to determine the refractive index in the thickness direction corresponding to a critical angle.

(7) Film Thickness

Film thickness was measured using an electronic micrometer (trade name: "K-312A", manufactured by Anritsu) at a stylus pressure of 30 g.

(8) Film-Forming Properties

According to the following criteria, evaluations were made on volatile emission at the time when a polymer was fed to an extruder and melt-extruded through a die and also on film-forming properties during the film stretching/forming process.

A: No volatile components are observed during polymer melt-extrusion, and a film can be produced without a rupture during the film formation process.

B: Volatile components are observed during polymer melt-extrusion, but a film can be produced without a rupture.

C: Volatile components are observed during polymer melt-extrusion, or a rupture sometime occurs and a film cannot be stably produced.

D: Volatile components are conspicuous during polymer melt-extrusion, or a rupture occurs so frequently that a film cannot be produced.

(9) Film Windability

During the film formation process, a film was wound up at a rate of 100 m/min into a roll shape 550 mm in width×6000 m. Based on the wound state and the roll appearance, evaluations were made according to the following criteria.

A: The roll has a good wound configuration.

B: A roll surface has at least one and less than five pimples (projecting bulges); nearly good.

C: The roll surface has five or more pimples (projecting bulges); poor appearance.

D: Film edge misalignment occurs in the roll; poor wound configuration.

(10) Self-Healing Characteristics

Aluminum was deposited on one side of a film sample to a thickness of 50 nm, and two deposited films were placed between glass plates to form a parallel plate capacitor. At this time, the effective area that creates capacity was 100 cm$^2$. While applying a load of 0.5 kg/cm$^2$ to the capacitor from above, voltage was applied between electrodes at 100 V/μm of film thickness.

Some samples were taken, and breakdown was caused at three points. Self-healing properties (a phenomenon in which the deposited film around a breakdown site is scattered to maintain insulation) were evaluated according to the following criteria.

AA: Self-healing was sufficient at all three points, maintaining good insulation.

A: Self-healing was sufficient at two points, maintaining good insulation. However, an insulation failure or short-circuit occurred at one point.

B: Self-healing was sufficient at one point, maintaining good insulation. However, an insulation failure or short-circuit occurred at two points.

C: An insulation failure or short-circuit occurred at all three points.

<Method for Preparing Titanium Catalyst PEN Polymer>

P1: 100 parts of 2,6-naphthalene dicarboxylic acid dimethyl ester (hereinafter sometimes referred to as NDC), 60 parts of ethylene glycol (hereinafter sometimes referred to as EG), and a titanium compound (containing titanium trimellitate at an elemental titanium content of 15 mmol %) were charged into a vessel made of SUS, and a transesterification reaction was carried out while raising the temperature from 140° C. to 240° C. After that, the reaction mixture was transferred to a polymerization reactor. The temperature was raised to 295° C., and a polycondensation reaction was carried out in a high vacuum of 30 Pa or less to give polyethylene-2,6-naphthalene dicarboxylate having an intrinsic viscosity of 0.6 dl/g.

<Method for Preparing PEN Polymer Containing Phenolic Stabilizer>

P2: The polyester resin obtained by the method of P1 and "Irganox® 1098" (N,N'-hexane-1,6-diylbis[3-(3,5-di-tert-butyl-4-hydroxyphenyl)propionamide]) (melting point: 156 to 161° C., vapor pressure: 1.3×10E-12 Pa (20° C.)) as the alkylenebisamide-type hindered phenol were charged into a twin-screw extruder having a preset temperature of 300° C. to a phenolic stabilizer content of 2 wt % (20000 ppm) based on the weight of the composition, and melt-kneaded to give a polyester resin composition (master pellets).

P3: Together with 100 parts of 2,6-naphthalene dicarboxylic acid dimethyl ester, 60 parts of ethylene glycol, and a titanium compound (containing titanium trimellitate at an elemental titanium content of 15 mmol %), "Irganox® 1010" (pentaerythritol tetrakis[3-(3,5-di-tert-butyl-4-hydroxyphenyl) propionate]) (melting point: 110 to 125° C., vapor pressure: 1.3×10E-10 Pa (20° C.)) as the phenolic stabilizer was charged into a vessel made of SUS in an amount of 0.8 wt % (8000 ppm) based on the weight of the composition, and a transesterification reaction was carried out while raising the temperature from 140° C. to 240° C. After that, the reaction mixture was transferred to a polymerization reactor. The temperature was raised to 295° C., and a polycondensation reaction was carried out in a high vacuum of 30 Pa or less to give polyethylene-2,6-naphthalene dicarboxylate.

P4: Together with 100 parts of 2,6-naphthalene dicarboxylic acid dimethyl ester, 60 parts of ethylene glycol, and a titanium compound (containing titanium trimellitate at an elemental titanium content of 15 mmol %), "Irganox® 1010" as the phenolic stabilizer was charged into a vessel made of SUS in an amount of 2 wt % (20000 ppm) based on the weight of the composition, and a transesterification reaction was carried out while raising the temperature from 140° C. to 240° C. After that, the reaction mixture was transferred to a polymerization reactor. The temperature was raised to 295° C., and a polycondensation reaction was carried out in a high vacuum of 30 Pa or less. However, the melt viscosity became too high during the reaction, exceeding the upper limit for melt-stirring in a polymerization apparatus.

P5: The polyester resin obtained by the method of P1 and "Irganox® 1010" as the phenolic stabilizer were charged into a twin-screw extruder having a preset temperature of 300° C. to a phenolic stabilizer content of 2 wt % (20000 ppm) based on the weight of the composition, and melt-kneaded to give a polyester resin composition (master pellets).

P6: The polyester resin obtained by the method of P1 and "Irganox® 1098" (N,N'-hexane-1,6-diylbis[3-(3,5-di-tert-butyl-4-hydroxyphenylpropionamide)]) (melting point: 156 to 161° C., vapor pressure: 1.3×10E-12 Pa (20° C.)) as the alkylenebisamide-type hindered phenol were charged into a twin-screw extruder having a preset temperature of 300° C. to a phenolic stabilizer content of 5 wt % (50000 ppm) based on the weight of the composition, and melt-kneaded to give a polyester resin composition (master pellets).

P7: Together with 100 parts of 2,6-naphthalene dicarboxylic acid dimethyl ester, 60 parts of ethylene glycol, and a titanium compound (containing titanium trimellitate at an elemental titanium content of 15 mmol %), "Irganox® 1098" (N,N'-hexane-1,6-diylbis[3-(3,5-di-tert-butyl-4-hydroxyphenyl)propionamide]) (melting point: 156 to 161° C., vapor pressure: 1.3×10E-12 Pa (20° C.)) as the phenolic stabilizer was charged into a vessel made of SUS to a phenolic stabilizer content of 2 wt % (20000 ppm) based on the weight of the composition, and a transesterification reaction was carried out while raising the temperature from 140° C. to 240° C. After that, the reaction mixture was transferred to a polymerization reactor. The temperature was raised to 295° C., and a polycondensation reaction was carried out in a high vacuum of 30 Pa or less to give polyethylene-2,6-naphthalene dicarboxylate having an intrinsic viscosity of 0.6 dl/g.

<Method for Preparing PEN Polymer Containing Fullerene>

P8: 100 parts by weight of 2-methylnaphthalene and 0.31 parts by weight of a fullerene were placed in a flask and thoroughly stirred at a temperature of about 200° C. Next, the polymer of P1 was dried at 70° C. for 6 hours, and added thereto in an amount of 63 parts by weight in small portions. After stirring for about 1 hour to 2 hours, the temperature was gradually raised. When the temperature finally reached 290° C., pressure reduction was started to remove 2-methylnaphthalene, thereby giving a resin composition. The amount of the fullerene added was 0.5 wt % (5000 ppm) relative to the weight of the polymer.

Incidentally, $C_{60}$ manufactured by Aldrich was used as the fullerene.

<Preparation of Silicone Resin Particles Surface-Treated with Silane Coupling Agent>

7000 g of an aqueous solution containing 0.06 wt % sodium hydroxide was charged into a 10-liter glass vessel equipped with a stirring blade, and 1000 g of methyltrimethoxysilane containing 0.01 wt % polyoxyethylene lauryl ether was gently poured into an upper layer to form two layers. An interface reaction was then carried out for 2 hours while slightly rotating the vessel at 10 to 15° C., thereby forming spherical particles. Subsequently, the mixture was aged for about 1 hour in the system having an internal temperature of 70° C., cooled, and filtered through a vacuum filter to give a cake-like product of silicone resin particles having a moisture content of about 40%. Next, 4000 g of an aqueous solution having dispersed therein 2 wt % γ-glycidoxypropyltrimethoxysilane as the silane coupling agent was charged into a separate glass vessel, and the whole amount of the cake-like product obtained in the above reaction was added thereto to form a slurry. A surface treatment was then performed at an internal temperature of 70° C. with stirring over 3 hours, and the mixture was cooled and filtered through a vacuum filter to give a cake-like product. Subsequently, the whole amount of the cake-like product was added to 600 g of pure water to form a slurry again. The mixture was stirred at normal temperature for 1 hour and then filtered through a vacuum filter again to give a cake-like product having a moisture content of about 40%, with an excessive emulsifier or silane coupling agent being removed. Finally, the cake-like product was subjected to pressure reduction at 100° C. and 15 torr for 10 hours to give about 400 g of a powder of silicone resin particles surface-treated with the silane coupling agent and having few agglomerated particles. The amount charged may be increased according to the amount particles needed.

Example 1

The polymers of P1 and P2 were blended in a ratio of 50 wt %:50 wt %. The polymer blend was dried at 180° C. for 6 hours and then fed to an extruder heated to 300° C. When the polymer was fed to the extruder, silicone resin particles surface-treated with the silane coupling agent by the above method and having an average particle size of 1.2 μm, a relative standard deviation of 0.14, and a particle size ratio of 1.1 and silicone resin particles surface-treated with the silane coupling agent by the above method and having an average particle size of 0.3 μm, a relative standard deviation of 0.17, and a particle size ratio of 1.1 were added as the spherical crosslinked polymeric resin particles (A) and the inert particles (B), respectively, each in the amount shown in Table 1.

The mixture was melt-kneaded in an extruder, then shaped into a sheet through a die having a temperature of 290° C., and cooled and solidified on a cooling roll. The resulting unstretched film was guided to a roll group heated to 140° C., stretched to 3.6 times the original length in the lengthwise direction (longitudinal direction), and then cooled on a roll group having a temperature of 60° C. Then, a coating liquid 1 shown below (2 wt %, components other than those shown in the table are water components such as an aqueous emulsion solution) was uniformly applied to one side by a roll coater.

Next, the longitudinally stretched film was guided to a tenter while holding both ends of the film with clips, and stretched to 4.0 times the original length in the direction perpendicular to the lengthwise direction (transverse direction) in a heated atmosphere where the highest transverse stretching temperature was 150° C. Subsequently, the film was heat-set in the tenter at 210° C. for 5 seconds, then heat-relaxed 1% at 200° C., and uniformly annealed and cooled to room temperature to give a biaxially oriented film having a thickness of 2 μm. The characteristics of the obtained film are shown in Table 1. The amount of the phenolic stabilizer in the substrate layer was 1.00 wt %. The obtained film had a breakdown voltage of 500 V/μm, indicating heretofore unavailable high withstand voltage characteristics. Further, the film-forming properties and the film windability were also excellent. In addition, the film also had excellent self-healing properties, and was suitable as an insulator for film capacitors.

<Coating Liquid 1>

Release Component: Polyethylene wax emulsion (propylene copolymer content: 6 mol %, polyethylene wax content: 48 wt %) The release component content in Table 1 shows the polyethylene wax content.

Surfactant: Polyoxyalkylene alkyl ether (manufactured by Lion Corporation, trade name: L950)

Crosslinking agent: Zirconyl ammonium carbonate

Examples 2 and 3

Biaxially oriented films were obtained in the same manner as in Example 1, except that the contents of the spherical crosslinked polymeric resin particles (A) and the inert particles (B) and the film thicknesses were changed as shown in Table 1. The characteristics of the obtained films are shown in Table 1.

Example 4

A biaxially oriented film was obtained in the same manner as in Example 1, except that the polymers of P1 and P2 were blended in a ratio of 75 wt %:25 wt %, and the amount of the phenolic stabilizer added was changed from 1.0 wt % to 0.5 wt %. The characteristics of the obtained film are shown in Table 1.

Example 5

A biaxially oriented film was obtained in the same manner as in Example 1, except that the coating layer composition was changed to a coating liquid 2 (2 wt %, components other than those shown in the table are water components), and the proportions were changed as shown in Table 1. The characteristics of the obtained film are shown in Table 1.

<Coating Liquid 2>

Release Component: Carboxy-modified silicone (manufactured by Shin-Etsu Chemical, trade name: X22-3701E)

Incidentally, the silicone compound was previously mixed with a surfactant and then added to the coating liquid.

Surfactant: Polyoxyethylene (n=8.5) lauryl ether (manufactured by Sanyo Chemical Industries, trade name: NAROACTY N-85)

Crosslinking agent: Oxazoline (manufactured by Nippon Shokubai, trade name: EPOCROS WS-300)

Example 6

A biaxially oriented film was obtained in the same manner as in Example 1, except that the spherical crosslinked polymeric resin particles (A) and the inert particles (B) were not added, and that the film thickness was changed as shown in Table 1. The characteristics of the obtained film are shown in Table 1.

Example 7

A biaxially oriented film was obtained in the same manner as in Example 1, except that no coating layer was provided. The characteristics of the obtained film are shown in Table 1.

Example 8

A biaxially oriented film was obtained in the same manner as in Example 1, except that spherical silica particles having particle size, relative standard deviation of particle size, and particle size ratio shown in Table 1 (manufactured by Nippon Shokubai, trade name: SEAHOSTAR KE) were added in the amounts shown in Table 1 in place of the spherical crosslinked polymeric resin particles (A) and the inert particles (B) of Example 1. The characteristics of the obtained film are shown in Table 1.

Example 9

A biaxially oriented film was obtained in the same manner as in Example 8, except that the spherical crosslinked polymeric resin particles (A) were not added, and that the content of the inert particles (B) and the film thickness were changed as shown in Table 1. The characteristics of the obtained film are shown in Table 1.

Example 10

A biaxially oriented film was obtained in the same manner as in Example 8, except that calcium carbonate particles were added as large particles to replace the spherical crosslinked polymeric resin particles (A) and platy aluminum silicate was added as the inert particles (B) in the amounts shown in Table 1. The characteristics of the obtained film are shown in Table 1.

TABLE 1

|   |   |   |   | Example 1 | Example 2 | Example 3 | Example 4 | Example 5 |
|---|---|---|---|---|---|---|---|---|
| Substrate Layer | Spherical Crosslinked Polymeric Resin Particles (A) | Kind |   | Silicone resin particles | Silicone resin particles | Silicone resin particles | Silicone resin particles | Silicone resin particles |
|   |   | Average Particle Size | μm | 1.2 | 1.2 | 1.2 | 1.2 | 1.2 |
|   |   | Relative Standard Deviation of Particle Size |   | 0.14 | 0.14 | 0.14 | 0.14 | 0.14 |
|   |   | Particle Size Ratio |   | 1.1 | 1.1 | 1.1 | 1.1 | 1.1 |
|   |   | Content | wt % (in substrate layer) | 0.3 | 0.3 | 0.3 | 0.3 | 0.3 |
|   | Inert Particles (B) | Kind |   | Silicone resin particles | Silicone resin particles | Silicone resin particles | Silicone resin particles | Silicone resin particles |
|   |   | Average Particle Size | μm | 0.3 | 0.2 | 0.3 | 0.3 | 0.3 |
|   |   | Relative Standard Deviation of Particle Size |   | 0.17 | 0.17 | 0.17 | 0.17 | 0.17 |
|   |   | Particle Size Ratio |   | 1.1 | 1.1 | 1.1 | 1.1 | 1.1 |
|   |   | Content | wt % (in substrate layer) | 0.2 | 0.1 | 0.2 | 0.2 | 0.2 |
|   | Phenolic Stabilizer | Kind |   | Irg 1098 | Irg 1098 | Irg 1098 | Irg 1098 | Irg 1098 |
|   |   | Content | wt % (in substrate layer) | 1.00 | 0.98 | 0.97 | 0.49 | 1.00 |
| Coating Layer | Release Component | Kind of Release Component |   | Polyethylene wax | Polyethylene wax | Polyethylene wax | Polyethylene wax | Silicone compund |
|   |   | Content of Release Component | wt % (in coating layer) | 40 | 40 | 40 | 40 | 20 |
|   | Surfactant |   | wt % (in coating layer) | 15 | 15 | 15 | 15 | 15 |
|   | Crosslinking Agent |   | wt % (in coating layer) | 5 | 5 | 5 | 5 | 5 |
|   | Coating Layer Thickness |   | μm | 0.04 | 0.04 | 0.04 | 0.04 | 0.04 |
| Film Properties | Film Thickness |   | μm | 2 | 2 | 3 | 2 | 2 |
|   | Breakdown Voltage (Average) |   | 25° C., V/μm | 500 | 520 | 530 | 480 | 500 |
|   | Film-Forming Properties |   |   | A | A | A | A | A |
|   | Film Windability |   |   | A | A | A | A | A |
|   | Self-Healing Characteristics |   |   | A | A | A | A | AA |

|   |   |   |   | Example 6 | Example 7 | Example 8 | Example 9 | Example 10 |
|---|---|---|---|---|---|---|---|---|
| Substrate Layer | Spherical Crosslinked Polymeric Resin Particles (A) | Kind |   | — | Silicone resin particles | Spherical silica particles | — | Calcium carbonate particles |
|   |   | Average Particle Size | μm | — | 1.2 | 1.5 | — | 1.2 |
|   |   | Relative Standard Deviation of Particle Size |   | — | 0.14 | 0.13 | — | 0.53 |
|   |   | Particle Size Ratio |   | — | 1.1 | 1.1 | — | 2 |
|   |   | Content | wt % (in substrate layer) | — | 0.3 | 0.3 | — | 0.3 |
|   | Inert Particles (B) | Kind |   | — | Silicone resin particles | Spherical silica particles | Bulk silica particles | Platy aluminium silicate |
|   |   | Average Particle Size | μm | — | 0.3 | 0.3 | 1.7 | 0.9 |
|   |   | Relative Standard Deviation of Particle Size |   | — | 0.17 | 0.17 | 7 | — |
|   |   | Particle Size Ratio |   | — | 1.1 | 1.1 | 1.3 | 3 |
|   |   | Content | wt % (in substrate layer) | — | 0.2 | 0.2 | 0.03 | 0.1 |
|   | Phenolic Stabilizer | Kind |   | Irg 1098 | Irg 1098 | Irg 1098 | Irg 1098 | Irg 1098 |
|   |   | Content | wt % (in substrate layer) | 0.99 | 1.00 | 0.99 | 0.98 | 0.98 |

TABLE 1-continued

| | | | | | | | | |
|---|---|---|---|---|---|---|---|---|
| Coating Layer | Release Component | Kind of Release Component | | | Polyethylene wax | — | Polyethylene wax | Polyethylene wax | Polyethylene wax |
| | | Content of Release Component | wt % (in coating layer) | | 40 | — | 40 | 40 | 40 |
| | Surfactant | | wt % (in coating layer) | | 15 | — | 15 | 15 | 15 |
| | Crosslinking Agent | | wt % (in coating layer) | | 5 | — | 5 | 5 | 5 |
| | Coating Layer Thickness | | μm | | 0.04 | — | 0.04 | 0.04 | 0.04 |
| Film Properties | Film Thickness | | μm | | 3 | 2 | 2 | 3 | 3 |
| | Breakdown Voltage (Average) | | 25° C., V/μm | | 510 | 500 | 450 | 480 | 420 |
| | Film-Forming Properties | | | | A | A | A | A | A |
| | Film Windability | | | | C | A | A | C | A |
| | Self-Healing Characteristics | | | | A | C | A | A | A |

Comparative Example 1

A biaxially oriented film was obtained in the same manner as in Example 1, except that the polymer of P3 was used in place of P1 and P2. The characteristics of the obtained film are shown in Table 2.

Comparative Example 2

A biaxially oriented film was obtained in the same manner as in Example 1, except that the polymers of P1 and P5 were blended in a ratio of 50 wt %:50 wt % in stead of blending the polymers of P1 and P2 in a ratio of 50 wt %:50 wt %. The characteristics of the obtained film are shown in Table 2.

Comparative Example 3

A biaxially oriented film was obtained in the same manner as in Example 1, except that only the polymer of P1 was used in place of the blend of P1 and P2. The characteristics of the obtained film are shown in Table 2.

Comparative Example 4

A biaxially oriented film was obtained in the same manner as in Example 1, except that only the polymer of P6 was used in place of the blend of P1 and P2. The characteristics of the obtained film are shown in Table 2.

TABLE 2

| | | | | | Comparaitve Example 1 | Comparaitve Example 2 | Comparaitve Example 3 | Comparaitve Example 4 |
|---|---|---|---|---|---|---|---|---|
| Substrate Layer | Spherical Crosslinked Polymeric Resin Particles (A) | Kind | | | Silicone resin particles | Silicone resin particles | Silicone resin particles | Silicone resin particles |
| | | Average Particle Size | μm | | 1.2 | 1.2 | 1.2 | 1.2 |
| | | Relative Standard Deviation of Particle Size | | | 0.14 | 0.14 | 0.14 | 0.14 |
| | | Particle Size Ratio | | | 1.1 | 1.1 | 1.1 | 1.1 |
| | | Content | wt % (in substrate layer) | | 0.3 | 0.3 | 0.3 | 0.3 |
| | Inert Particles (B) | Kind | | | Silicone resin particles | Silicone resin particles | Silicone resin particles | Silicone resin particles |
| | | Average Particle Size | μm | | 0.3 | 0.3 | 0.3 | 0.3 |
| | | Relative Standard Deviation of Particle Size | | | 0.17 | 0.17 | 0.17 | 0.17 |
| | | Particle Size Ratio | | | 1.1 | 1.1 | 1.1 | 1.1 |
| | | Content | wt % (in substrate layer) | | 0.2 | 0.1 | 0.2 | 0.2 |
| | Phenolic Stabilizer | Kind | | | Irg 1010 | Irg 1010 | — | Irg 1098 |
| | | Content | wt % (in substrate layer) | | 0.01 | 0.10 | — | 4.98 |
| Coating Layer | Release Component | Kind of Release Component | | | Polyethylene wax | Polyethylene wax | Polyethylene wax | Polyethylene wax |
| | | Content of Release Component | wt % (in coating layer) | | 40 | 40 | 40 | 40 |
| | Surfactant | | wt % (in coating layer) | | 15 | 15 | 15 | 15 |
| | Crosslinking Agent | | wt % (in coating layer) | | 5 | 5 | 5 | 5 |
| | Coating Layer Thickness | | μm | | 0.04 | 0.04 | 0.04 | 0.04 |
| Film Properties | Film Thickness | | μm | | 2.0 | 2.0 | 2.0 | 2.0 |
| | Breakdown Voltage | | V/μm | | 380 | 390 | 350 | — |
| | Film-Forming Properties | | | | C | C | A | D |
| | Film Windability | | | | A | C | A | — |
| | Self-Healing Characteristics | | | | A | A | A | — |

Example 11

The polymers of P1 and P7 were blended in a ratio of 50 wt %:50 wt %. The polymer blend was dried at 180° C. for 6 hours, then fed to an extruder heated to 300° C., and shaped into a sheet through a die having a temperature of 290° C. The extruded sheet was brought into close contact with a textured cooling roll by applying static electricity to both ends of the sheet using a needle-shaped edge pinning apparatus (applied voltage: 3 kV DC), and thereby cooled and solidified. The resulting unstretched film was guided to a roll group heated to 140° C., stretched to 3.6 times the original length in the lengthwise direction (longitudinal direction), and then cooled on a roll group having a temperature of 60° C.

Next, the longitudinally stretched film was guided to a tenter while holding both ends of the film with clips, and stretched to 4.0 times the original length in the direction perpendicular to the lengthwise direction (transverse direction) in a heated atmosphere where the highest transverse stretching temperature was 150° C. Subsequently, the film was heat-set in the tenter at 235° C. for 5 seconds, then heat-relaxed 1% at 200° C., and uniformly annealed and cooled to room temperature to give a biaxially oriented polyester film having a thickness of 3 μm. The characteristics of the obtained film are shown in Table 3. The amount of the phenolic stabilizer in the substrate layer was 1.00 wt % (10000 ppm).

Example 12

A biaxially oriented film was obtained in the same manner as in Example 11, except that the heat set temperature was changed to 245° C. The characteristics of the obtained film are shown in Table 3.

Example 13

A biaxially polyester oriented film was obtained in the same manner as in Example 12, except that the polymers of P1 and P7 were blended in a ratio of 75 wt %:25 wt %, and the amount of the phenolic stabilizer added was changed from 1.0 wt % to 0.5 wt %. The characteristics of the obtained film are shown in Table 3.

Example 14

A 3-μm-thick biaxially oriented polyester film was obtained by the same procedure as in Example 11 using the same polymer as in Example 11, except that an electrostatic application technique was changed to a pinning wire (SUS 304 (φ0.1 mm)) to obtain an unstretched film. The characteristics of the obtained film are shown in Table 3.

Example 15

A 3-μm-thick biaxially oriented polyester film was obtained by the same procedure as in Example 11 using the same polymer as in Example 11, except that the electrostatic application technique was changed to the pinning wire (SUS 304 (φ0.1 mm)), the longitudinal draw ratio was changed to 3.0, the transverse draw ratio was changed to 3.0, and the heat set temperature was changed to 230° C. The characteristics of the obtained film are shown in Table 3.

Example 16

A 3-μm-thick biaxially oriented polyester film was obtained by the same procedure as in Example 11, except that the longitudinal draw ratio was changed to 2.9 and the transverse draw ratio was changed to 2.9. The characteristics of the obtained film are shown in Table 3.

Comparative Example 5

A 3-μm-thick biaxially oriented polyester film was obtained by the same procedure as in Example 11, except that only P1 was used as the polymer. The characteristics of the obtained film are shown in Table 3.

TABLE 3

| | | | Example 11 | Example 12 | Example 13 | Example 14 | Example 15 | Example 16 | Comparative Example 5 |
|---|---|---|---|---|---|---|---|---|---|
| Composition | Phenolic Stabilizer Content | wt % (in substrate layer) | 1 | 1 | 0.5 | 1 | 1 | 1 | 0 |
| Film Production Conditions | Electrostatic Application Technique | | Edge pinning | Edge pinning | Edge pinning | Edge pinning | Edge pinning | Edge pinning | Edge pinning |
| | Longitudinal Draw Ratio | times the original length | 3.6 | 3.6 | 3.6 | 3.6 | 3.0 | 2.9 | 3.6 |
| | Transverse Draw Ratio | times the original length | 4.0 | 4.0 | 4.0 | 4.0 | 3.0 | 2.9 | 4.0 |
| | Heat Set Temperature | ° C. | 235 | 245 | 245 | 235 | 230 | 235 | 235 |
| Film Properties | Film Thickness | μm | 3 | 3 | 3 | 3 | 3 | 3 | 3 |
| | Refractive Index in Film Thickness Direction Nz | — | 1.509 | 1.513 | 1.515 | 1.500 | 1.508 | 1.518 | 1.510 |
| | Breakdown Voltage (Average) | 25° C., V/μm | 500 | 515 | 490 | 490 | 490 | 510 | 380 |
| | Breakdown Voltage (Standard Deviation) | 25° C., V/μm | 16 | 15 | 17 | 30 | 60 | 90 | 18 |
| | Breakdown Voltage (Minimum) | 25° C., V/μm | 465 | 470 | 460 | 430 | 430 | 420 | 320 |
| | Film-Forming Properties | | A | A | A | A | A | A | A |

Example 17

59 wt % of the polymer P2, 10 wt % of the polymer P8, 30 wt % of a syndiotactic polystyrene resin (manufactured by Idemitsu Kosan, grade: 90ZC), and 1 wt % of a compatibilizer (fumaric-acid-modified polyphenylene ether (Idemitsu Kosan, CX-1)) were blended, and the polymer blend was dried at 180° C. for 6 hours and then fed to an extruder heated to 300° C.

The mixture was melt-kneaded in the extruder, then shaped into a sheet through a die having a temperature of 290° C., and cooled and solidified on a cooling roll. The resulting unstretched film was guided to a roll group heated to 140° C., stretched to 3.6 times the original length in the lengthwise direction (longitudinal direction), and then cooled on a roll group having a temperature of 60° C. Next, the longitudinally stretched film was guided to a tenter while holding both ends of the film with clips, and stretched to 4.0 times the original length in the direction perpendicular to the lengthwise direction (transverse direction) in a heated atmosphere where the highest transverse stretching temperature was 150° C. Subsequently, the film was heat-set in the tenter at 210° C. for 5 seconds, then heat-relaxed 1% at 200° C., and uniformly annealed and cooled to room temperature to give a biaxially oriented film having a thickness of 2 μm. The characteristics of the obtained film are shown in Table 4.

The film of this example had a high breakdown voltage. In addition, the dielectric loss tangent was low at a high temperature of 120° C., and thus the film was excellent in suppressing self-heating. Further, the film-forming properties were also excellent.

Example 18

A 2-μm-thick biaxially oriented polyester film was obtained by the same procedure as in Example 17, except that the polymer P2 content was changed to 49 wt %, and that the polymer P8 content was changed to 20 wt %. The characteristics of the obtained film are shown in Table 4.

Example 19

A 2-μm-thick biaxially oriented polyester film was obtained by the same procedure as in Example 17, except that the polymer P2 content was changed to 69 wt %, and that the polymer P8 was not used. The characteristics of the obtained film are shown in Table 4.

Example 20

A 2-μm-thick biaxially oriented polyester film was obtained by the same procedure as in Example 17, except that the syndiotactic polystyrene resin content was changed to 20 wt %, and that a polyphenylene ether resin (manufactured by Mitsubishi Engineering-Plastics Corporation, PX-100L) was used in an amount of 10 wt %. The characteristics of the obtained film are shown in Table 4.

Example 21

A 2-μm-thick biaxially oriented polyester film was obtained by the same procedure as in Example 20, except that the polymer P2 content was changed to 69 wt %, and that the polymer P8 was not used. The characteristics of the obtained film are shown in Table 4.

Example 22

A 2-μm-thick biaxially oriented polyester film was obtained by the same procedure as in Example 17, except that the polymer P1 and the polymer P6 were used in amounts of 29 wt % and 40 wt %, respectively, in place of the polymer P2 and the polymer P8. The characteristics of the obtained film are shown in Table 4.

Example 23

A 2-μm-thick biaxially oriented polyester film was obtained by the same procedure as in Example 17, except that the polymers of P1 and P2 were blended in a ratio of 50 wt %:50 wt %. The characteristics of the obtained film are shown in Table 4.

Comparative Example 6

A 2-μm-thick biaxially oriented polyester film was obtained by the same procedure as in Example 17, except that the polymer P1 and a syndiotactic polystyrene resin (manufactured by Idemitsu Kosan, grade: 90ZC) were blended in amounts of 70 wt % and 30 wt %, respectively. The characteristics of the obtained film are shown in Table 4.

Comparative Example 7

A 2-μm-thick biaxially oriented polyester film was obtained by the same procedure as in Example 17, except that the polymer P2 was changed to the polymer P1. The characteristics of the obtained film are shown in Table 4.

Comparative Example 8

A 2-μm-thick biaxially oriented polyester film was obtained by the same procedure as in Example 20, except that the polymer P2 was changed to the polymer P1. The characteristics of the obtained film are shown in Table 4.

TABLE 4

| | | | | Comparative Example 6 | Comparative Example 7 | Example 17 | Example 18 | Example 19 |
|---|---|---|---|---|---|---|---|---|
| Film Composition | Polymer Composition | PEN | wt % (*1) | 70 | 69 | 69 | 69 | 69 |
| | | SPS | wt % | 30 | 30 | 30 | 30 | 30 |
| | | PPE | wt % | | | | | |
| | | Compatibilizer | wt % | | 1 | 1 | 1 | 1 |
| | Additive | Phenolic Stabilizer | wt % | 0 | 0 | 1.18 | 0.98 | 1.35 |
| | | Fullerene | wt % | 0 | 0.05 | 0.05 | 0.1 | 0 |
| Film Properties | Film Thickness | | μm | 2 | 2 | 2 | 2 | 2 |
| | Breakdown Voltage (Average) | | 25° C., V/μm | 280 | 350 | 500 | 550 | 500 |
| | Breakdown Voltage (Average) | | 120° C., V/μm | 210 | 295 | 305 | 310 | 300 |
| | Dielectric Loss Tangent (tanδ) | | 120° C. | 0.005 | 0.005 | 0.005 | 0.005 | 0.005 |
| | Film-Forming Properties | | | C | A | A | A | A |

| | | | | Comparative Example 8 | Example 20 | Example 21 | Example 22 | Example 23 |
|---|---|---|---|---|---|---|---|---|
| Film Composition | Polymer Composition | PEN | wt % (*1) | 69 | 69 | 69 | 69 | 100 |
| | | SPS | wt % | 20 | 20 | 20 | 30 | |
| | | PPE | wt % | 10 | 10 | 10 | | |
| | | Compatibilizer | wt % | 1 | 1 | 1 | 1 | |
| | Additive | Phenolic Stabilizer | wt % | 0 | 1.18 | 1.35 | 1.98 | 1.00 |
| | | Fullerene | wt % | 0.05 | 0.05 | 0 | 0 | 0 |

TABLE 4-continued

| Film | Film Thickness | μm | 2 | 2 | 2 | 2 | 2 |
|---|---|---|---|---|---|---|---|
| Properties | Breakdown Voltage (Average) | 25° C., V/μm | 330 | 580 | 530 | 550 | 500 |
| | Breakdown Voltage (Average) | 120° C., V/μm | 300 | 310 | 305 | 290 | 300 |
| | Dielectric Loss Tangent (tanδ) | 120° C. | 0.004 | 0.004 | 0.00 | 0.005 | 0.001 |
| | Film-Forming Properties | | A | A | A | B | A |

PEN: Polyethylene naphthalene dicarboxylate
SPS: Syndiotactic polystyrene
PPE: Polyphenylene ether
(*1): Content as a PEN master containing additives

INDUSTRIAL APPLICABILITY

According to the invention, a biaxially oriented film for electrical insulation of the invention has even better higher withstand voltage characteristics than conventional insulating films and also has excellent film-forming properties. The industrial value thereof is extremely high.

The invention claimed is:

1. A process for producing a film capacitor comprising forming the film capacitor with a biaxially oriented film for electrical insulation comprising a substrate layer containing crystalline thermoplastic resin as a main component, wherein the crystalline thermoplastic resin is a polyethylene naphthalene dicarboxylate alone or in combination with syndiotactic polystyrene,
wherein the polyethylene naphthalene dicarboxylate is present in an amount of 60 wt % or more based on the total amount of the crystalline thermoplastic resin,
wherein the film is characterized in that the substrate layer contains a phenolic stabilizer in an amount of 0.3 wt % or more and 1.5 wt % or less based on the weight of the substrate layer, and the phenolic stabilizer is an alkylene bisamide-type hindered phenol,
wherein the alkylene bisamide-type hindered phenol is N,N'-hexane-1,6-diylbis[3-(3,5-di-tert-butyl-4-hydroxyphenyl)propionamide],
wherein the film comprises a coating layer on one side or both sides of the substrate layer, the coating layer containing a silicone compound in an amount of 1 to 50 wt % based on the weight of the coating layer,
wherein the film further comprises a metal layer on the coating layer,
wherein the phenolic stabilizer is melt-kneaded with polymerized polyester,
wherein a breakdown voltage of the film at 25° C. is 450V/μm or more.

2. The process according to claim 1, wherein the substrate layer contains spherical crosslinked polymeric resin particles (A) having an average particle size of 0.5 μm or more and 3.0 μm or less in an amount of 0.01 wt % or more and 1.5 wt % or less based on the weight of the substrate layer.

3. The process according to claim 2, wherein the substrate layer further contains inert particles (B) having an average particle size of 0.01 μm or more and less than 0.5 μm in an amount of 0.05 wt % or more and 2.0 wt % or less based on the weight of the substrate layer, the average particle size of the inert particles (B) being at least 0.4 μm smaller than the average particle size of the spherical crosslinked polymeric resin particles (A).

4. The process according to claim 3, wherein the inert particles (B) are spherical crosslinked polymeric resin particles (B1).

5. The process according to claim 4, wherein the spherical crosslinked polymeric resin particles (A) or (B1) are silicone resin particles.

6. The process according to claim 2, wherein the spherical crosslinked polymeric resin particles (A) are silicone resin particles.

7. The process according to claim 1, wherein the substrate layer contains a fullerene in an amount of 0.01 wt % or more and 1 wt % or less based on the weight of the substrate layer.

8. The process according to claim 1, wherein an average breakdown voltage of the film at 25° C. obtained from 50 measurements is 450 V/μm or more with a standard deviation of 20 V/μm or less.

9. The process according to claim 1, wherein the substrate layer has a refractive index in the thickness direction nz of more than 1.505.

10. The process according to claim 1, wherein the substrate layer has a thickness of 0.2 μm or more and 5 μm or less.

11. The process according to claim 1, wherein the silicone compound has a reactive group.

12. A film capacitor made using a biaxially oriented film for electrical insulation comprising a substrate layer containing crystalline thermoplastic resin as a main component, wherein the crystalline thermoplastic resin is a polyethylene naphthalene dicarboxylate alone or in combination with syndiotactic polystyrene,
wherein the polyethylene naphthalene dicarboxylate is present in an amount of 60 wt % or more based on the total amount of the crystalline thermoplastic resin,
the film being characterized in that the substrate layer contains a phenolic stabilizer in an amount of 0.3 wt % or more and 1.5 wt % or less based on the weight of the substrate layer, and the phenolic stabilizer is an alkylenebisamide-type hindered phenol,
wherein the alkylene bisamide-type hindered phenol is N,N'-hexane-1,6-diylbis[3-(3,5-di-tert-butyl-4-hydroxyphenyl)propionamide],
the film comprising a coating layer on one side or both sides of the substrate layer, the coating layer containing a silicone compound in an amount of more than 20 wt % to 50 wt % based on the weight of the coating layer,
the film further comprising a metal layer on the coating layer,
wherein the phenolic stabilizer is melt-kneaded with polymerized polyester,
wherein a breakdown voltage of the film at 25° C. is 450V/μm or more.

13. The film capacitor according to claim 12, wherein the coating layer contains a silicone compound in an amount of 40 to 50 wt % based on the weight of the coating layer.

14. The film capacitor according to claim 13, wherein no fullerene is present in the film.

15. The film capacitor according to claim 12, wherein the substrate layer contains the phenolic stabilizer in an amount of 0.49 wt % or more and 1.35 wt % or less based on the weight of the substrate layer.

16. The film capacitor according to claim 12, wherein the substrate layer contains the phenolic stabilizer in an amount of 0.49 wt % or more and 1.00 wt % or less based on the weight of the substrate layer.

17. The film capacitor according to claim 12, wherein the crystalline thermoplastic resin is present in an amount of 97 wt % or more based on the weight of the substrate layer.

* * * * *